United States Patent
Garg et al.

(10) Patent No.: US 9,967,025 B2
(45) Date of Patent: May 8, 2018

(54) DIAGNOSTIC PORT FOR INTER-SWITCH AND NODE LINK TESTING IN ELECTRICAL, OPTICAL AND REMOTE LOOPBACK MODES

(71) Applicant: Brocade Communications Systems, Inc., San Jose, CA (US)

(72) Inventors: Meenakshi Garg, Chennai (IN); Venugopal Tummala, Chennai (IN); Gin Man Cheung, Sunnyvale, CA (US); Raymond Grigsby, Los Gatos, CA (US); Balakrishna Wusirika, Pleasanton, CA (US)

(73) Assignee: Brocade Communications Systems, LLC, San Jose, CA (US)

( * ) Notice: Subject to any disclaimer, the term of this patent is extended or adjusted under 35 U.S.C. 154(b) by 37 days.

(21) Appl. No.: 13/789,519

(22) Filed: Mar. 7, 2013

(65) Prior Publication Data

US 2013/0266307 A1    Oct. 10, 2013

Related U.S. Application Data

(63) Continuation-in-part of application No. 13/047,513, filed on Mar. 14, 2011, now Pat. No. 8,798,456.

(Continued)

(51) Int. Cl.
| | | |
|---|---|---|
| *H04B 10/073* | (2013.01) | |
| *H04B 10/077* | (2013.01) | |
| *H04B 10/079* | (2013.01) | |
| *H04B 10/27* | (2013.01) | |
| *H04B 10/25* | (2013.01) | |
| *H04L 12/947* | (2013.01) | |
| *H04Q 11/00* | (2006.01) | |

(52) U.S. Cl.
CPC ....... *H04B 10/0775* (2013.01); *H04B 10/073* (2013.01); *H04B 10/077* (2013.01); *H04B 10/079* (2013.01); *H04B 10/0773* (2013.01); *H04B 10/0779* (2013.01); *H04B 10/0793* (2013.01); *H04B 10/0795* (2013.01); *H04B 10/0799* (2013.01); *H04B 10/25* (2013.01);
(Continued)

(58) Field of Classification Search
None
See application file for complete search history.

(56) References Cited

U.S. PATENT DOCUMENTS

| 7,397,788 B2 * | 7/2008 | Mies et al. ............ 370/351 |
| 2002/0104039 A1 * | 8/2002 | DeRolf et al. ............ 714/30 |

(Continued)

OTHER PUBLICATIONS

European Extended Search Report issued in corresponding EP Application No. 14157829.4 dated Jul. 1, 2014, 5 pages.

(Continued)

*Primary Examiner* — Li Liu
(74) *Attorney, Agent, or Firm* — Blank Rome, LLP

(57) ABSTRACT

A diagnostic testing utility is used to perform single link diagnostics tests including an electrical loopback test, an optical loopback test, a link traffic test, and a link distance measurement test. To perform the diagnostic tests, two ports at each end of a link are identified and then statically configured by a user. The ports will be configured as D_Ports and as such will be isolated from the fabric with no data traffic flowing through them. This configuration can be static or can be on request or on errors. The ports will then be used to send test frames to perform the diagnostic tests. After completion of requested or on error testing the ports can return to normal operation.

20 Claims, 19 Drawing Sheets

Related U.S. Application Data

(60) Provisional application No. 61/379,150, filed on Sep. 1, 2010.

(52) U.S. Cl.
CPC ............ *H04B 10/27* (2013.01); *H04L 49/25* (2013.01); *H04Q 11/0062* (2013.01); *H04Q 2011/0083* (2013.01)

(56) References Cited

U.S. PATENT DOCUMENTS

| | | |
|---|---|---|
| 2003/0120984 A1* | 6/2003 | Chuah et al. ................ 714/716 |
| 2004/0071389 A1* | 4/2004 | Hofmeister et al. ............ 385/16 |
| 2008/0232794 A1* | 9/2008 | Absillis et al. ................... 398/9 |
| 2009/0202239 A1* | 8/2009 | Holness et al. ................ 398/33 |
| 2009/0214221 A1* | 8/2009 | Li et al. ........................ 398/136 |
| 2010/0074614 A1* | 3/2010 | DeLew et al. ................. 398/17 |
| 2012/0051738 A1 | 3/2012 | Skirmont et al. |

OTHER PUBLICATIONS

Brocade Communication Systems, Inc.; "Fabric OS Administrator's Guide", Supporting Fabric OS v5.3.0; Publication No. 53-1000448-01; Jun. 15, 2007.

Brocade Communication Systems, Inc.; "Fabric OS Command Reference Manual", Supporting Fabric OS v6.0.0; Publication No. 53-1000599-01; Oct. 19, 2007.

Brocade Communications Systems, Incorporated; "Fabric OS" Command Reference Manual, Supporting Fabric OS 6.1.0, #53-1000599-02, Mar. 12, 2008.

\* cited by examiner

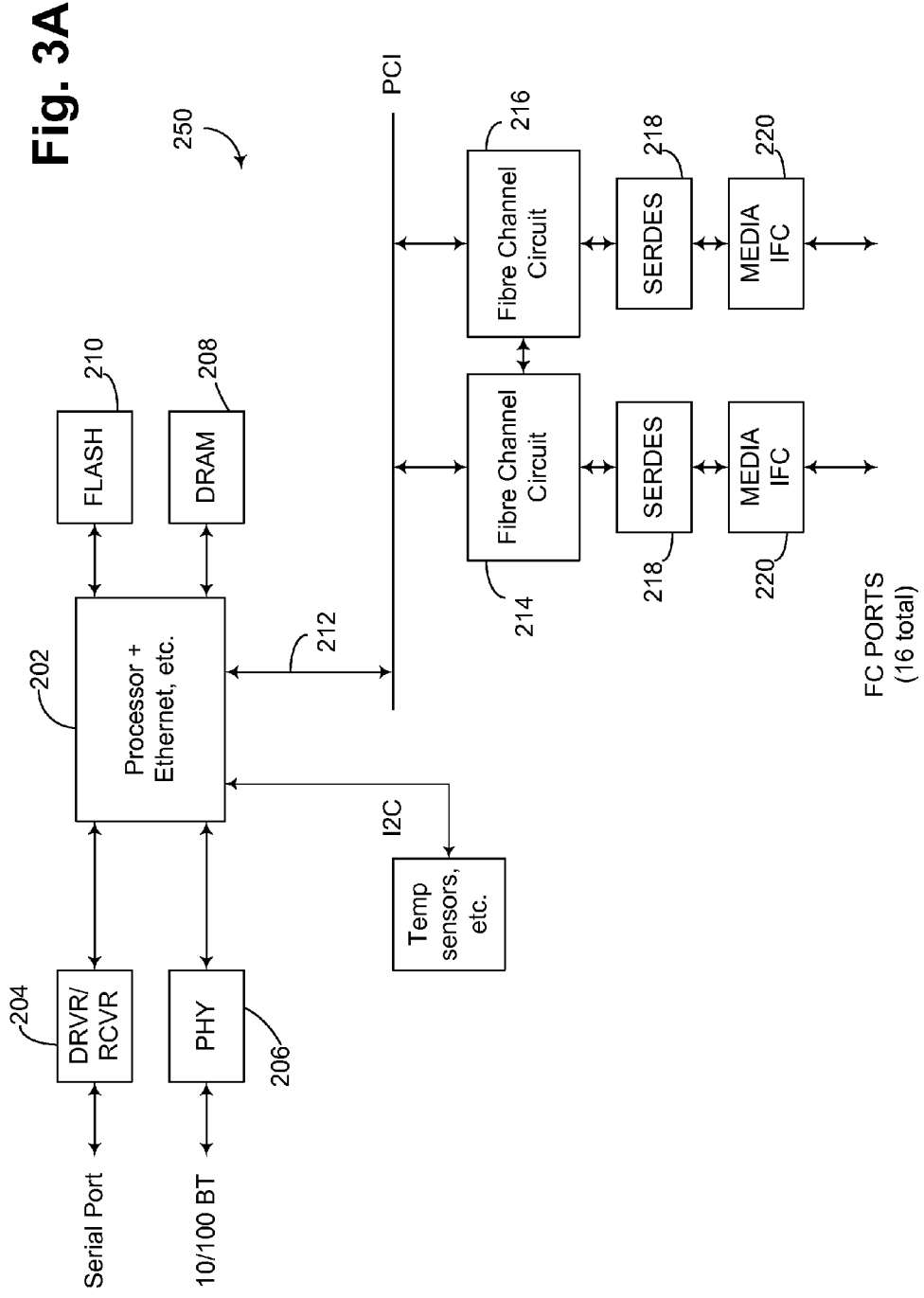

DIAGNOSTIC PORT FOR INTER-SWITCH AND NODE LINK TESTING IN ELECTRICAL, OPTICAL AND REMOTE LOOPBACK MODES

CROSS-REFERENCE TO RELATED APPLICATIONS

This application is a continuation-in-part of U.S. patent application Ser. No. 13/047,513, entitled "Diagnostic Port for Inter-Switch Link Testing in Electrical, Optical and Remote Loopback Modes," by David Skirmont, Saumitra Buragohain and Balakrishna Wusirika, filed Mar. 14, 2011, which is a non-provisional of Ser. No. 61/379,150, filed Sep. 1, 2010, both of which are hereby incorporated by reference.

TECHNICAL FIELD

The present invention relates to the field of computer networking, and in particular to techniques for performing link level diagnostics in a switch fabric.

BACKGROUND

Storage area networks (SANs) are typically implemented to interconnect data storage devices and data servers or hosts, using network switches to provide interconnectivity across the SAN. SANs may be complex systems with many interconnected computers, switches, and storage devices. The switches are typically configured into a switch fabric, and the hosts and storage devices are connected to the switch fabric through ports of the network switches that comprise the switch fabric. Most commonly, Fibre Channel (FC) protocols are used for data communication across the switch fabric, as well as for the setup and teardown of connections to and across the fabric, although these protocols may be implemented on top of Ethernet or Internet Protocol (IP) networks.

Many SANs rely on the FC protocol. The FC protocol defines standard media and signaling conventions for transporting data in a serial fashion. It also provides an error correcting channel code and a frame structure for transporting the data. Many FC switches provide at least some degree of automatic configurability. For example, they may automatically sense when a new inter-switch link (ISL) becomes active, and may initiate an initialization process to discover what the link connects to. The switch may automatically determine various parameters for the link (e.g. link speed). As FC networks are created, updated, maintained and de-commissioned, switches may be enabled, disabled or reconfigured, and links may be added or removed.

Over time, FC networks have become more complex, with multiple fabrics involving several switches that use inter-switch links (ISLs) connected to switch ports (E_ports) on the switches. As FC networks have become more complex, the network speeds have also increased significantly. As faster networks are implemented, media and cable tolerance become more important for avoiding degraded performance and cyclic redundancy check (CRC) errors. At the same time, as larger networks are developed, diagnostic of optics and cables become more and more time consuming and intrusive. Current switches have two basic types of built-in diagnostics. First, the SFP electro-optical modules have digital diagnostics, but these only operate at the SFP component level. Second, a command line interface (CLI) tool may be provided to allow frames to be injected and circulated on a specific link, but the end result is only a good and bad indication, which does not greatly aid diagnosis. Thus, troubleshooting suspected link errors with the existing built-in tools is time consuming and can become a daunting task. The use of external separate testing tools is also cumbersome and brings along separate problems not present with built-in tools It would be desirable to implement an efficient network diagnostic method to more efficiently troubleshoot larger networks, thereby improving the speed, efficiency, and reliability of these networks.

SUMMARY

In one embodiment, a network link level diagnostic tool is disclosed. The diagnostic tool can monitor and set alerts for digital diagnostics, test both ends of the connectivity to validate that the links are within budget, saturate a link with a representative SAN traffic profile to validate fabric performance, monitor and trend for the integrity of the optics during its operational life cycle, and granularly measures cable distance to determine physical limitation or performance degradation of the link over time.

BRIEF DESCRIPTIONS OF THE DRAWINGS

FIG. 3A is a block diagram of an exemplary switch.

DETAILED DESCRIPTIONS

Figure 1:
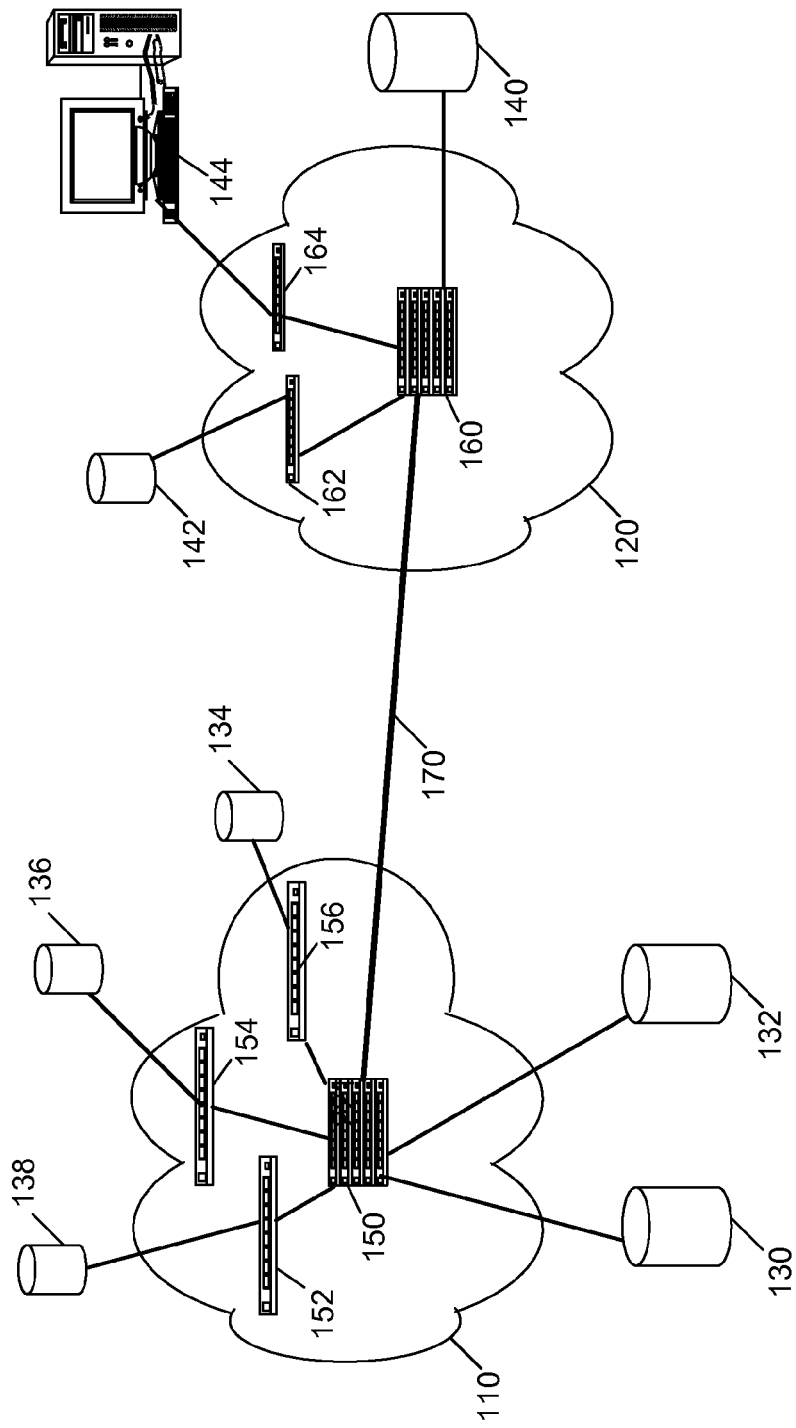
FIG. 1 is a block diagram illustrating an exemplary Fibre Channel network.

An exemplary FC network is illustrated in FIG. 1. As illustrated, the FC network of FIG. 1 includes two FC fabrics, a fabric 110 and a fabric 120. The fabric 120 includes switches 160, 162, 164 which are coupled to each other via ISLs and are each also connected to either a storage device or a computer system. For example, switch 164 is coupled to the computer system 144 and switch 162 is coupled to a storage device 142. The computer system 144 may be any suitable node device including a desktop computer, a server, or a user terminal. The FC fabric 110 is shown having three switches 150, 152 and 154 coupled together via ISLs. These switches are also each coupled to one or more storage devices. Switch 150 is coupled to storage devices 130 and 132, while switch 154 is coupled to storage device 136, and switch 152 is coupled to storage device 138. The switches 150 and 160 each have a router port which are connected to each other by link 170. By using router ports instead of typical E_Ports, the fabrics 110 and 120 stay separate and do not merge into a single fabric.

Each of the storage devices shown in FIG. 1 may be any suitable node device including a JBOD (Just a Bunch of Disks), RAID (Redundant Array of Inexpensive Disks) array, tape library, or network data store. Each of the switches may have as few as two and as many as 256 or more ports.

As illustrated in FIG. 1, FC networks can be complex. As such, diagnosing possible errors or faulty links in these networks can be challenging. To more efficiently troubleshoot large networks and improve the speed, efficiency, and reliability of the networks, the inventors provide a method of diagnosing potential problems in inter-switch links using diagnostic ports ("D_Port").

D_Ports are ports that are configured by the user for the purpose of running diagnostics. In a preferred embodiment of the present invention, any FC port can be configured as a D_Port. However, once a port is configured as a D_Port, it will no longer be part of the fabric as it will not carry any inter-switch or data traffic. A D_Port will also not merge fabrics. The D_Port is only used for link diagnostic purposes and to isolate link level faults.

Accordingly, a D_Port is configured to run one or more link level diagnostic tests with minimal user intervention and provide comprehensive test results. The diagnostic tests performed by a D_Port achieve one or more of the following: 1) test both ends of a link's connectivity to validate that the link is within dB budget; 2) saturate a link with a representative SAN traffic profile to validate fabric performance; and 3) monitor and determine trends for the integrity of the optics during its operational life cycle.

In a preferred embodiment of the present invention, two different software modules are used. The operation and configurability of D_Ports are handled by the fabric module. In the preferred embodiment, the fabric module implements the Fibre Channel Switch Fabric (FCSF) standard. The fabric module follows the FCSF standard for fabric initialization processes, such as determining the E_ports, assigning unique domain IDs to switches, throttling the trunking process, and distributing the domain and alias list to all switches in the fabric. The fabric module also performs D_Port related operations such as reading small form-factor pluggable (SFP) capabilities and sending out state change notices (SCNs) of the D_Port to notify other modules in the preferred embodiment. The fabric module performs some of these D_Port related operations through the use of switch drivers. The diag module is the diagnostics module and implements the spinfab CLI command.

In some embodiments, D_Port diagnostics may be performed on E_ports connected to ISLs between network switches in the fabric. In other embodiments, D_Port diagnostics may be performed on F_ports connected to links to N_ports on devices. In yet other embodiments, D_Port diagnostics may be performed on E_ports, F_ports, and N_ports. For clarity, the discussion below is typically written in terms of, D_Port diagnostics using E_ports, but similar techniques may be used for, D_Port diagnostics in F_ports and N_ports. Some of these conditions may only apply to E_ports, while others may only apply to F_ports or N_ports, and others may apply to any port.

Figure 2:
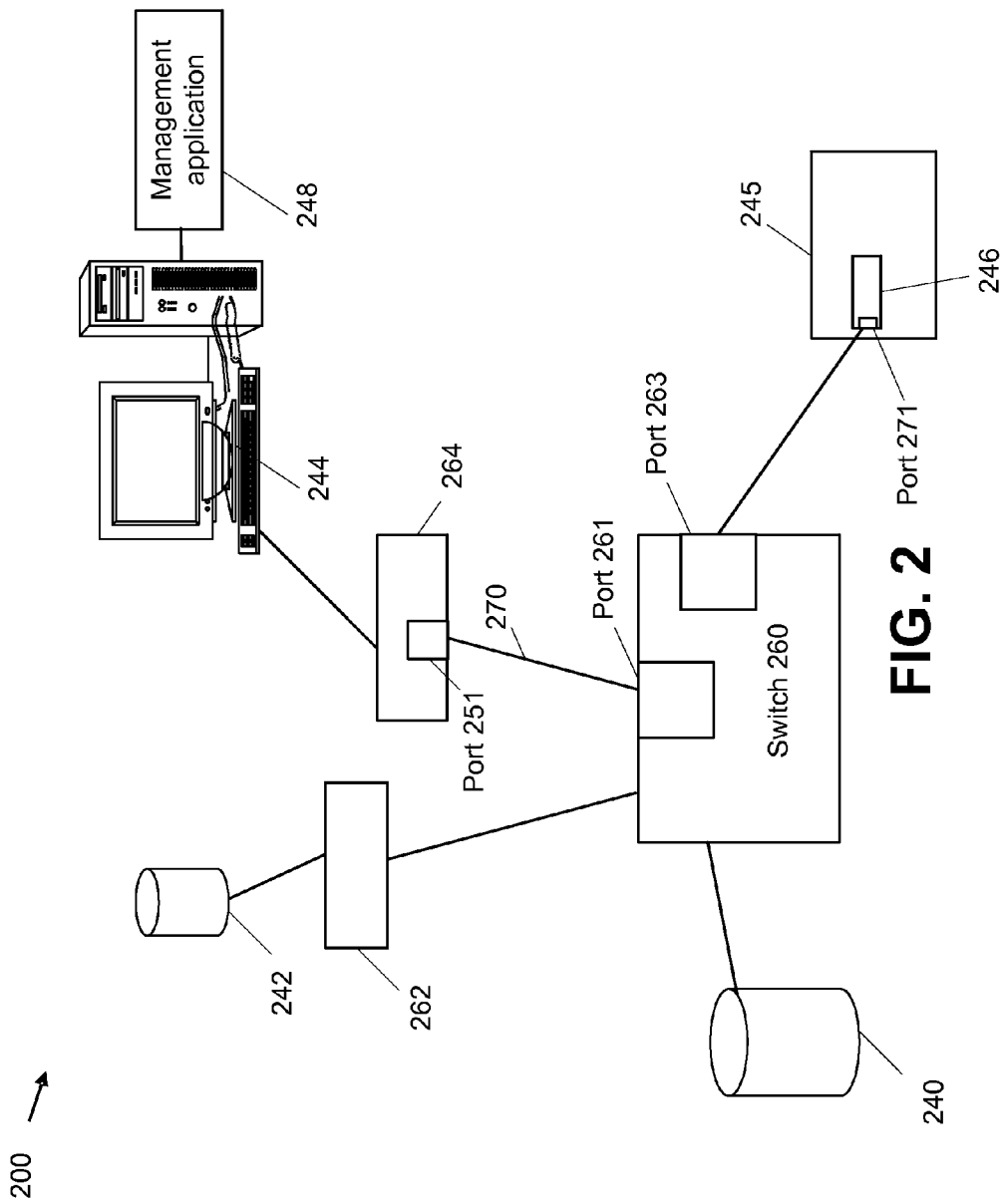
FIG. 2 is a block diagram illustrating an exemplary Fibre Chancel network implementing D_Port diagnostics according to one embodiment.

FIG. 2 is a block diagram illustrating a FC network which implements one embodiment of the use of D_Ports. FIG. 2 illustrates switches 260, 262 and 264. Each of these switches is coupled to one or more storage devices or computer systems. For example, switch 264 is coupled to the computer system 244, switch 262 is coupled to the storage device 242, and switch 260 is coupled to the storage device 240. Some of the switches are also coupled to each other through ISLs. For example, switch 260 is coupled through ports 261 and 251 to switch 264. Switch 260 includes a port 263 connected to port 271 of a host bus adapter (HBA) 246 in a host or server 245. This link will be described as a node link to distinguish it from an ISL.

Although illustrated in FIG. 2 as a single chassis, the switches 260 and 264 may comprise a plurality of network switches in one or more chassis. In the network 200, hosts and devices are connected into a SAN using the switches. (The numbers of storage devices and switches are illustrative and by way of example only, and any desired number of storage devices and switches may be connected in the network 200.)

As can be seen in FIG. 2, the connections between the switches create inter-switch links. As such, switches 264 and 260 are coupled to each other through the inter-switch link 270. Each of the inter-switch links can be diagnosed in accordance with the preferred embodiment of the present invention. For example, the inter-switch link 270 can be diagnosed to detect potential faults and validate inter-switch connectivity. To do this the two ports at each end of the link would first need to be configured as D_Ports. The exemplary steps involved in configuring the ports as D_Ports are illustrated in the flow chart of FIG. 4.

FIG. 3A illustrates a basic block diagram of a switch 250, such as switches 260, 262, or 264 according to the preferred embodiment of the present invention. A processor and I/O interface complex 202 provides the processing capabilities of the switch 250. The processor may be any of various suitable processors, including the Freescale or IBM PowerPC. The I/O interfaces may include low speed serial interfaces, such as RS-232, which use a driver/receiver circuit 204, or high-speed serial network interfaces, such as Ethernet, which use a PHY circuit 206 to connect to a local area network (LAN). Main memory or DRAM 208 and flash or permanent memory 210, are connected to the processor complex 202 to provide memory to control and be used by the processor.

The processor complex 202 also includes an I/O bus interface 212, such as a PCI bus, to connect to Fibre Channel circuits 214 and 216. In one embodiment, the processor complex 202 runs the modules used in performing the diagnostics tests of the present invention. The Fibre Channel circuits 214, 216 in the preferred embodiment each contain eight Fibre Channel ports. Each port is connected to an external SERDES circuit 218, which in turn is connected to a media interface 220, conventionally an SFP, which receives the particular Fibre Channel medium used to interconnect switches used to form a fabric or to connect to various devices. SFPs according to the present invention include optical loopback capabilities to allow incoming frames to be looped back out within the SFP itself, rather than requiring a receiving ASIC to perform the looping within the necessary electro-optical conversions. Further, SFPs according to the present invention include internal electrical loopback capabilities to allow near end testing. The processor complex 202 uses the fabric module to communicate with the SFPs to set both the electrical and optical loopback modes.

Figure 3B:
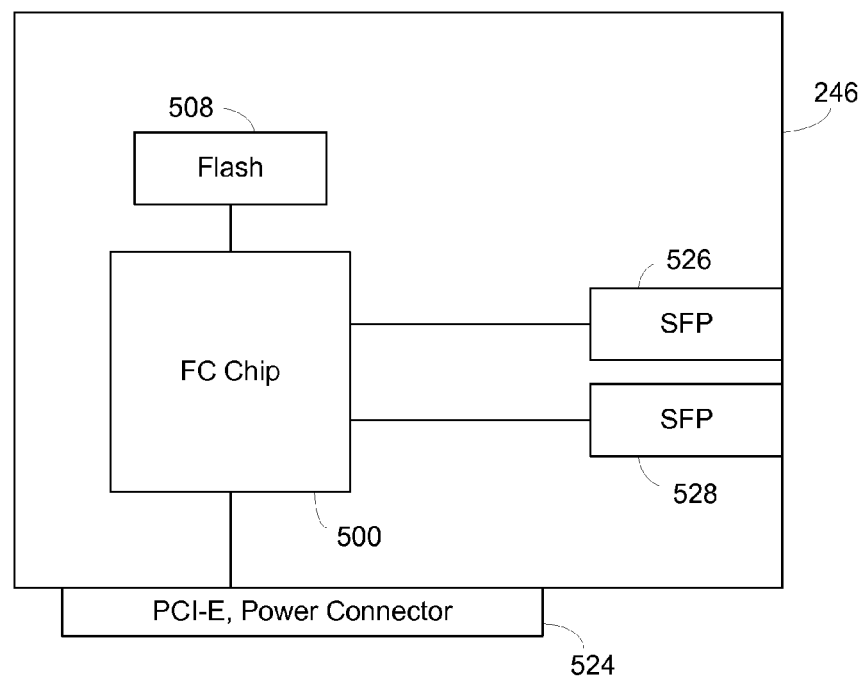
FIG. 3B is a block diagram of an exemplary host bus adapter.

FIG. 3B illustrates an exemplary HBA 246. An FC chip 500 is connected to a PCI-E and power connector block 524 for communication of PCI-E signals, power and clock. The FC chip 500 is also connected to SFP module blocks 526 and 528. The SFP modules receive optoelectronic converters for use with fiber optic cabling, as commonly used in Fibre Channel. Flash memory 508 holds the firmware for the CPUs, which are embedded in the FC chip 500. For various embodiments the flash memory 508 contains the firmware, the equivalent to the relevant portion of the fabric module and switch drivers of the switches, to allow D_Port operations as described below. In other embodiments the software to perform the D_Port operations is split between the firmware and a host driver which is executing on the host system and its processor.

Figure 3C:
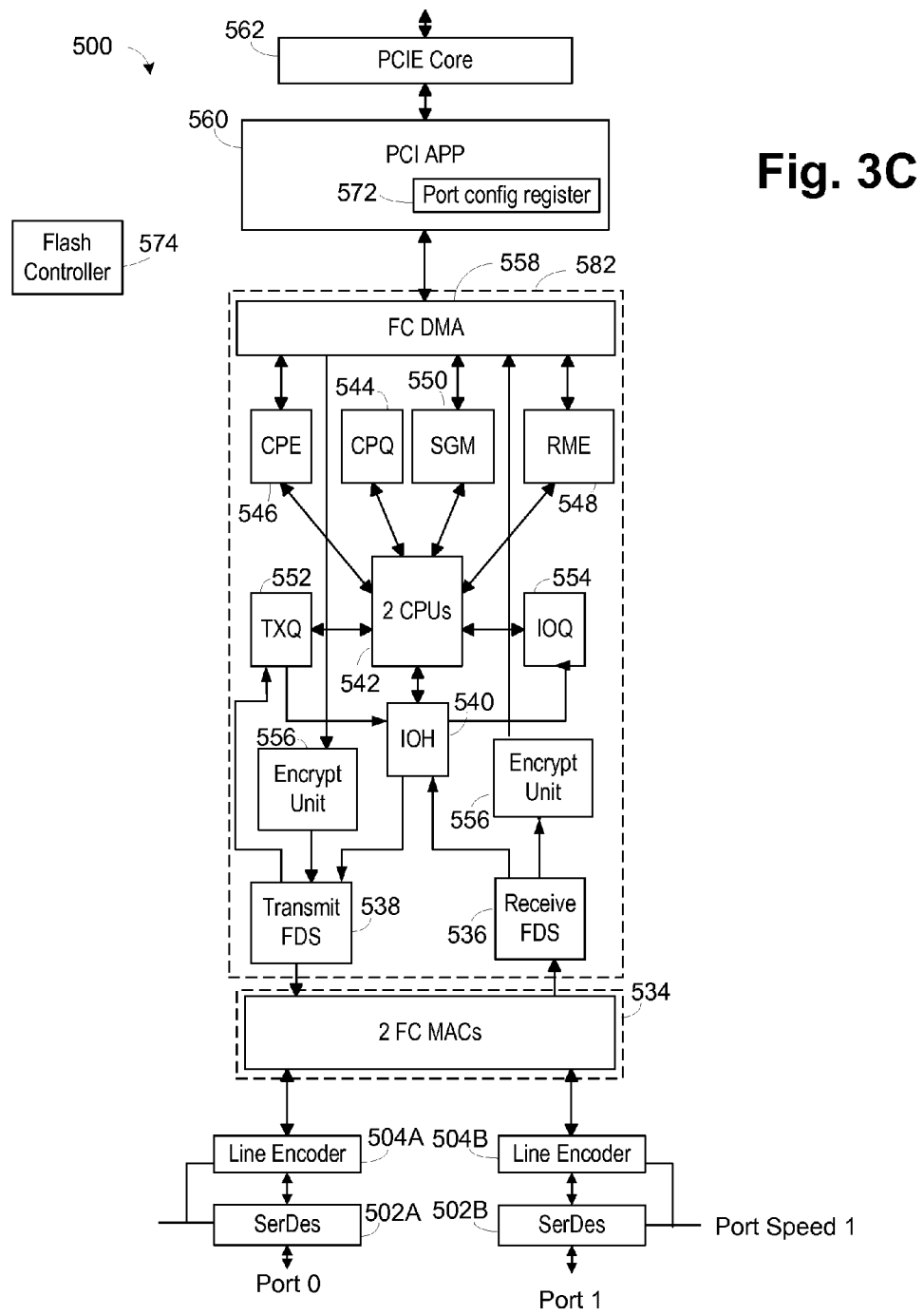
FIG. 3C is a block diagram of the FC chip of FIG. 3B.

FIG. 3C illustrates a detailed block diagram of the FC chip 500. The FC chip 500 is formed by various modules. They are briefly listed below in table form, with more detailed description following the table.

TABLE 1

| Description of the FC chip 500 modules | |
|---|---|
| Serdes 502 | Serializer/deserializer that can be configured as 16/8/4/2/1G FC. |
| Line Encoder 504 | Performs 8b/10b or 64b/66b encoding and decoder, depending on protocol and speed. 8/4/2/1G FC uses 8b/10b. 16G FC uses 64b/66b. |
| FC MAC 534 | This block contains the FC MAC for traditional 16/8G FC. It also contains the XFM which is the 10G/14G FC MAC. |
| Rx FDS 536 | This holds the inbound FC frames received from RxA or from the FC MAC that are headed towards the IOH/CPU. |
| Tx FDS 538 | This holds the outbound FC frames that need to be transmitted to the FC MAC. |
| IOH 540 | This block maintains the IO State Table that holds the context for the FC IOs. It interfaces with a number of other blocks (IOQ, FDS, CPU, TxQ). |
| CPU0/1 542 | These are two on-chip CPUs that are used for a number of purposes including initialization of the FC chip 300, setting up and tearing down of FC IOs, handling of exceptions, processing management frames, such as D_Port operations, and so on. The firmware for the CPUs is stored in off board flash memory 508. |
| CPQ 544 | This holds all the event queues that need CPU processing. CPQ interfaces with a number of blocks on the FC side to route events to the CPUs. |
| CPE 546 | This is the Command Prefetch block that interfaces with the host and DMAs commands to the CPUs for further processing. |
| RME 548 | This is the Reply Message block that is used by the CPU to send IO completion information to the host. |
| SGM 550 | This block holds the scatter-gather elements for all the IOs processed by the CPU and IOH. It performs DMAs to the host to prefetch/fetch scatter gather vectors. |
| TxQ 552 | This structure holds all the queues and frame related information for Tx frames which are headed towards the FC MAC. |
| IOQ 554 | This block contains all the IO related queues that are directed towards the host, for FC frames. |
| Encrypt Unit 556 | This block contains encryption/decryption logic to perform encryption and decryption operations if needed. |
| FC DMA 558 | This block contains all the upstream and downstream data DMA engines that transfer frames from the FDS to the host or vice-versa. |

TABLE 1-continued

| Description of the FC chip 500 modules | |
|---|---|
| PCI APP 560 | This collects DMA requests from FC-DMA and sends them to the PCI-E core. It routes completions for these requests back to the FC-DMA. It contains the SR-IOV related structures and logic that present a virtualized chip to the PCI-E. It interfaces to the PCI-E core. |
| PCI-E core 562 | This is the SR-IOV PCI-E core that has the Adaptation, Translation, Link and Physical Layer functionality for PCI-E bus transfers to/from the host. |

The PCI APP 560 provides the PCI-E interface to the FC chip 300. It can act as PCI-E Master and initiate DMA transfers. It can also function as a PCI-E Target for host accesses. The PCI APP 560 hides all the PCI-E complexity from the rest of the chip 300. It interfaces with PCI-E core 562 on one side and chip blocks on the other side and supports the following features:

High-Bandwidth data path to and from the host memory.
Cross-clock synchronization between System Clock and PCI-E Clock domains.
Supporting outstanding Memory Read Requests on PCI-E interface.
Supporting Max Read Request Size of 2 k bytes.
Supporting Max Payload Size of 2 k bytes.
Accepting 2 k byte aligned Memory Write requests from the DMA block.
Providing the register interface for host programming.
Providing Host-Local CPU Mailboxes.
Providing the shared interface to the rest of the chip for all four functions.

The PCI-E APP 560 connects the PCI-E core 562 to the FC DMA block 558. The SGM block 550 is connected to the FC DMA block 558 and the CPUs 542. The FC DMA block 526 allows for bus mastering in the FC chip 300, i.e., to move data to and from the host memory.

An I/O command is fetched via the PCI-E core 562 and PCI-E APP block 560 by the FC DMA block 558, which forwards the command to the CPQ block 544. Two Fibre Channel media access controllers (MACs) 534 provide an interface to a SAN fabric. An upstream path between the FC MACs 534 and the PCI-E APP block 560 comprises receive buffers in a receive frame data storage unit (RX FDS) block 536, an encryption unit 556, and the FC DMA block 558. A downstream path between the FC MACs 534 and the PCI-E APP block 560 comprises the FC DMA block 558, an Encryption Unit 556, and transmit buffers in a transmit frame data storage unit (Transmit FDS) block 538. The Tx FDS block 526 and the Transmission FDS block 538 communicate with the CPUs 542, and the Transmit FDS block 538 additionally communicates with the transmission queue (TXQ) block 552. A crossbar I/O handler (IOH) block 540 receives data from the FC MACs 534 and communicates with the Transmit FDS block 538, the CPUs 542, and the IOQ block 554. The IOQ block 554 communicates with the IOH block 540, the FC DMA block 558, and the CPU queue (CPQ) block 544. The CPQ block 544 receives data from the IOQ block 554, the TXQ block 552, and the FC DMA block 558, and transmits data to the CPUs 542.

Figure 4:
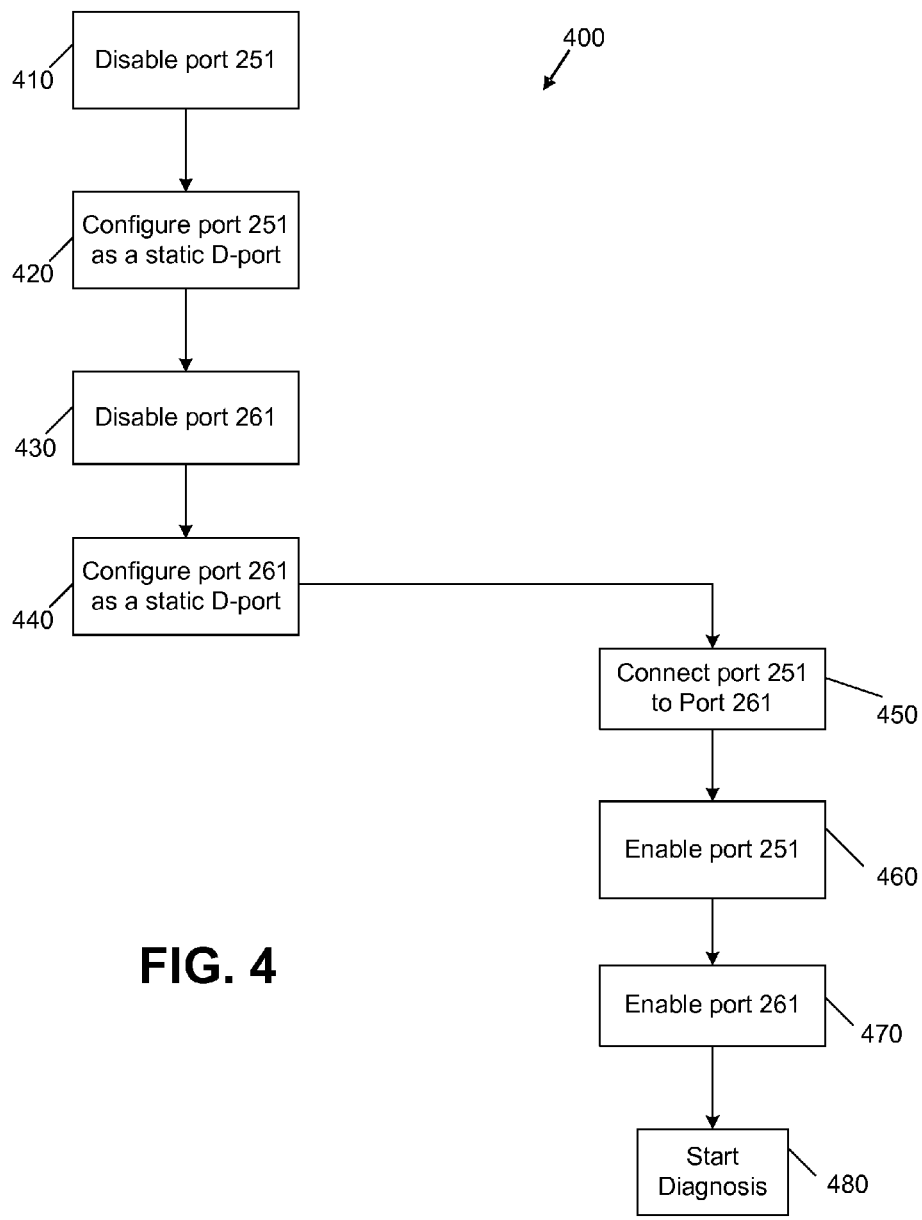
FIG. 4 is a flowchart illustrating a method for configuring switch ports as D_Ports according to one embodiment.

As illustrated in FIG. 4, the method 400 starts at step 410 by disabling port 251. This is done so that the port is no longer part of the fabric and cannot carry data traffic. After the port has been disabled, the method goes on to configure port 251 as a static D_Port, in step 420. After port 251 has been configured as a D_Port, the next step is to disable and configure port 261 as a static D_Port in steps 430 and 440, respectively. After both ports have been configured as D_Ports, the method connects port 251 to port 261. When the two ports are connected, the method enables port 251 and port 261, at steps 460 and 470, respectively. In one embodiment, when both ports 251 and 261 have been have been enabled, the method is ready to start diagnosis at step 480. In another embodiment, the diagnostic tests will start automatically when the second port is enabled.

In one embodiment, the method 400 can be initiated by a user (e.g. a network administrator) through an application 248 accessed on an administrative workstation such as the computer system 244 of FIG. 2. The application 248 may include one or more user interfaces or GUIs (not shown) that enable the user to identify the ISL intended to be diagnosed and turn on a diagnostic mode. Turning on the diagnostic mode may start running the method 400 automatically on the identified ISL. In other embodiments, the user may initiate each step of the method 400. In one embodiment, the user is able to decide which diagnostic tests to run on the ISL. After the diagnostic tests have been performed, the result may be presented to the user for analysis.

The application 248 may be provided on any desired non-volatile computer-readable program storage media including, but not limited to, all forms of optical and magnetic, including solid-state, storage elements, including removable media. The application workstation 244 may be any desired type of computational device, including a virtualized computer executing on any real hardware platform desired.

In addition to using the application 248, D_Port diagnostics may use a command line interface (CLI) implemented on one of the switches 260 or 264 to allow the user to initiate the diagnosis. In such an embodiment, the diagnosis can be initiated using a port identifier as a parameter to the diagnostic command. The process may include querying the switches in the network 200 for the list of ports and then sending D_Port diagnostic requests for the selected ports. The diagnostic command may block waiting for completion of the diagnostic request. The command may also result in a message indicating successful or unsuccessful completion of the diagnostics tests and/or displaying the test results.

The diagnostics tests initiated at step 480 of method 400 include one or more of the following tests: 1) electrical loopback test; 2) optical loopback test; and 3) link traffic test. In one embodiment, a test initiator port, such as the port 510 illustrated in FIG. 5, initiates the diagnostic tests, while a port at the other end of the link, referred to as the test responder 520, responds. In one embodiment, the ports are designated as an initiator or responder based on a predetermined characteristic of the ports such as their World Wide Name (WWN). For example, the port having a higher WWN may be designated as the initiator, while the port having a lower WWN may get designated as the responder. In another embodiment the initiator status is set by user command, allowing either port to be an initiator.

Figure 5:
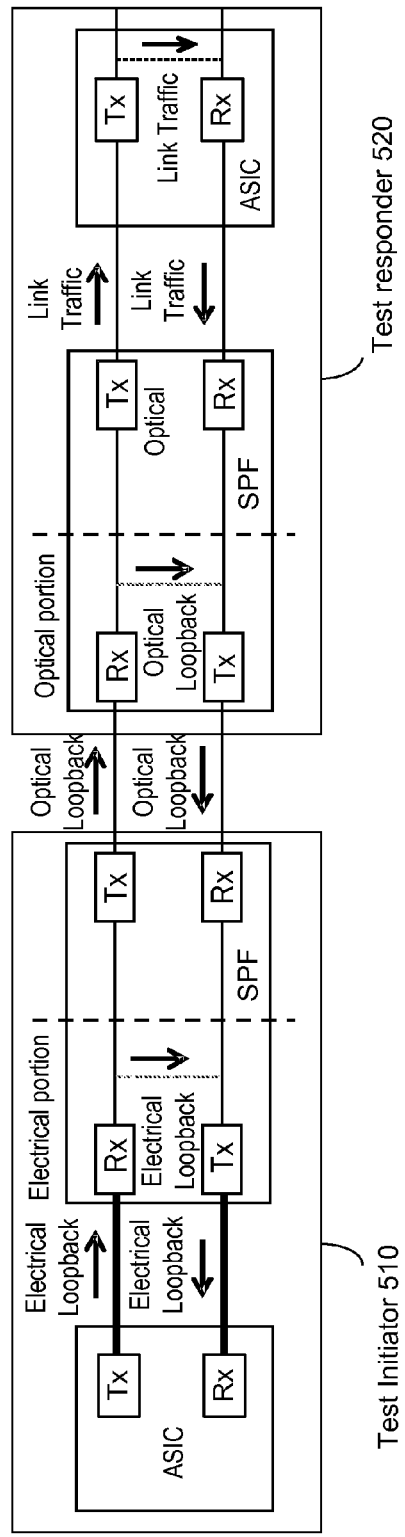
FIG. 5 is a block diagram illustrating the D_Port diagnostic tests performed on links according to one embodiment.

As illustrated in FIG. 5, the electrical loopback test can occur at either the initiator or responder ports locally. In contrast, the optical loopback and the link traffic tests depend on the remote port to send the test frames back and should be performed using the remote port as well as the local port. In one embodiment, in order to perform the link traffic test both local and remote ports should be programmed to retransmit the frames received on that port. During the test, millions of test frames are injected into the local port transmit circuit. These frames are transmitted onto the link through the local SFP. The remote port receives the frames from the remote SFP and retransmits them back to the source port. The received frames are then checked for any errors.

In one embodiment, the link level tests involve an FC test utility referred to as spinfab. Spinfab is an online diagnostics command that can verify ISL links between switches at the maximum speed. The test is done by setting up the routing functionality in the hardware such that test frames received by an E_Port are retransmitted on the same E_Port. Several frames are then sent to ports attached to each active E_Port specified. These frames are special frames which never occur during normal traffic and the default action for such frames is to route them back to the sender. The frames are circulated between switches until the test stops them. The fabric module relies on the diag module for running spinfab.

Figure 6A:
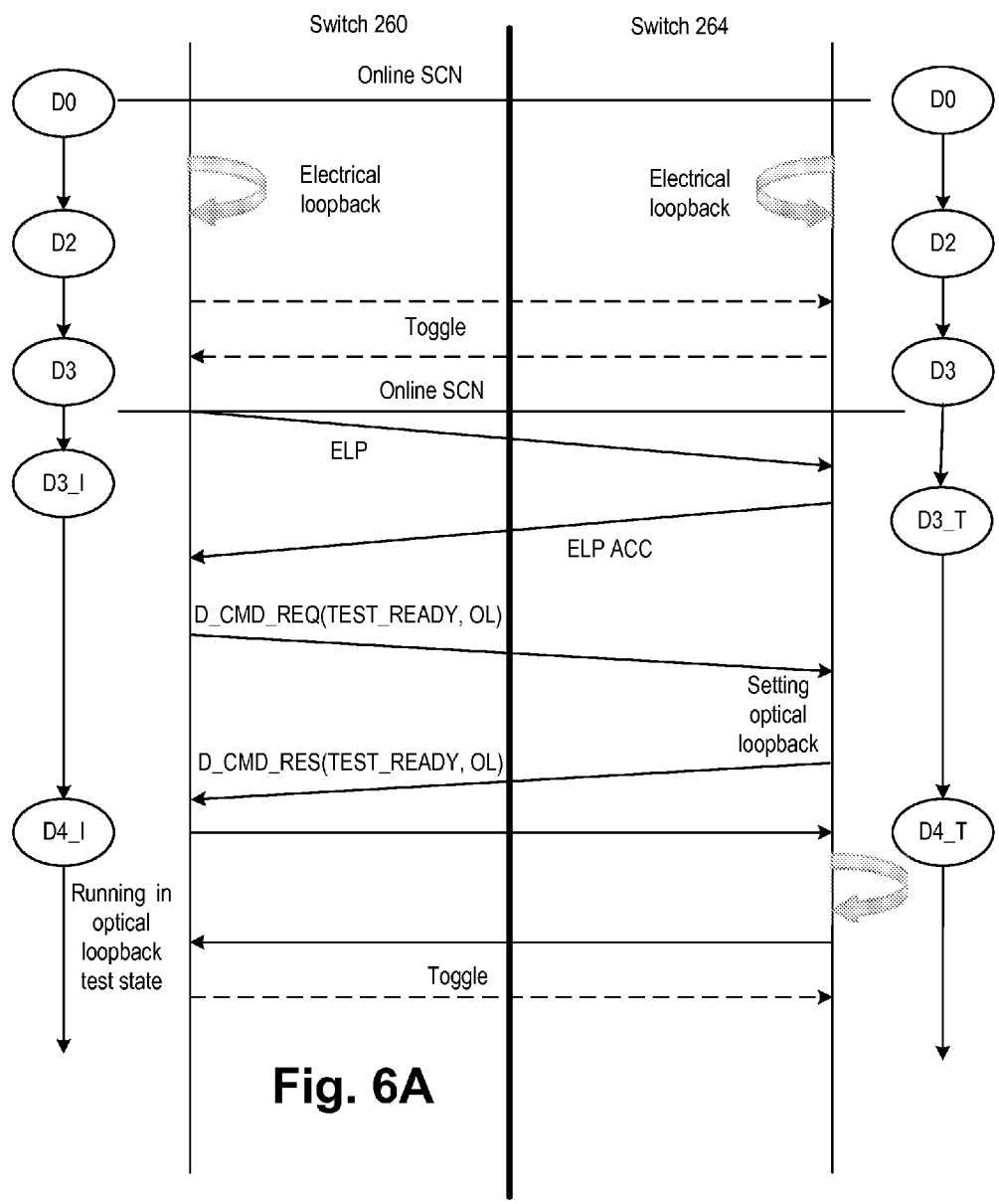
FIGS. 6A and 6B are a ladder diagram illustrating the states of D_Ports as they will go through a D_Port diagnostic according to one embodiment for an inter-switch link.
Figure 6B:
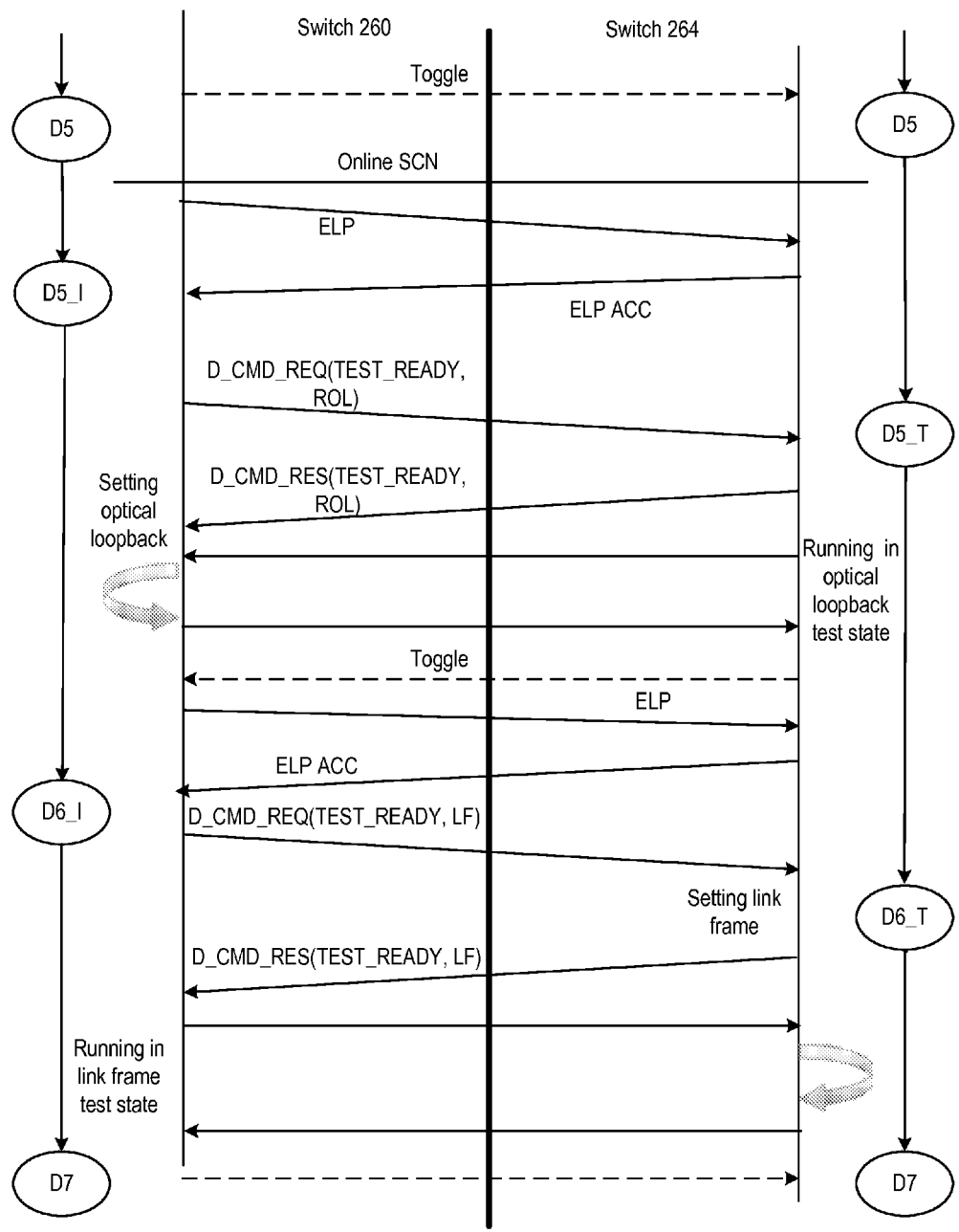
Figure 7:
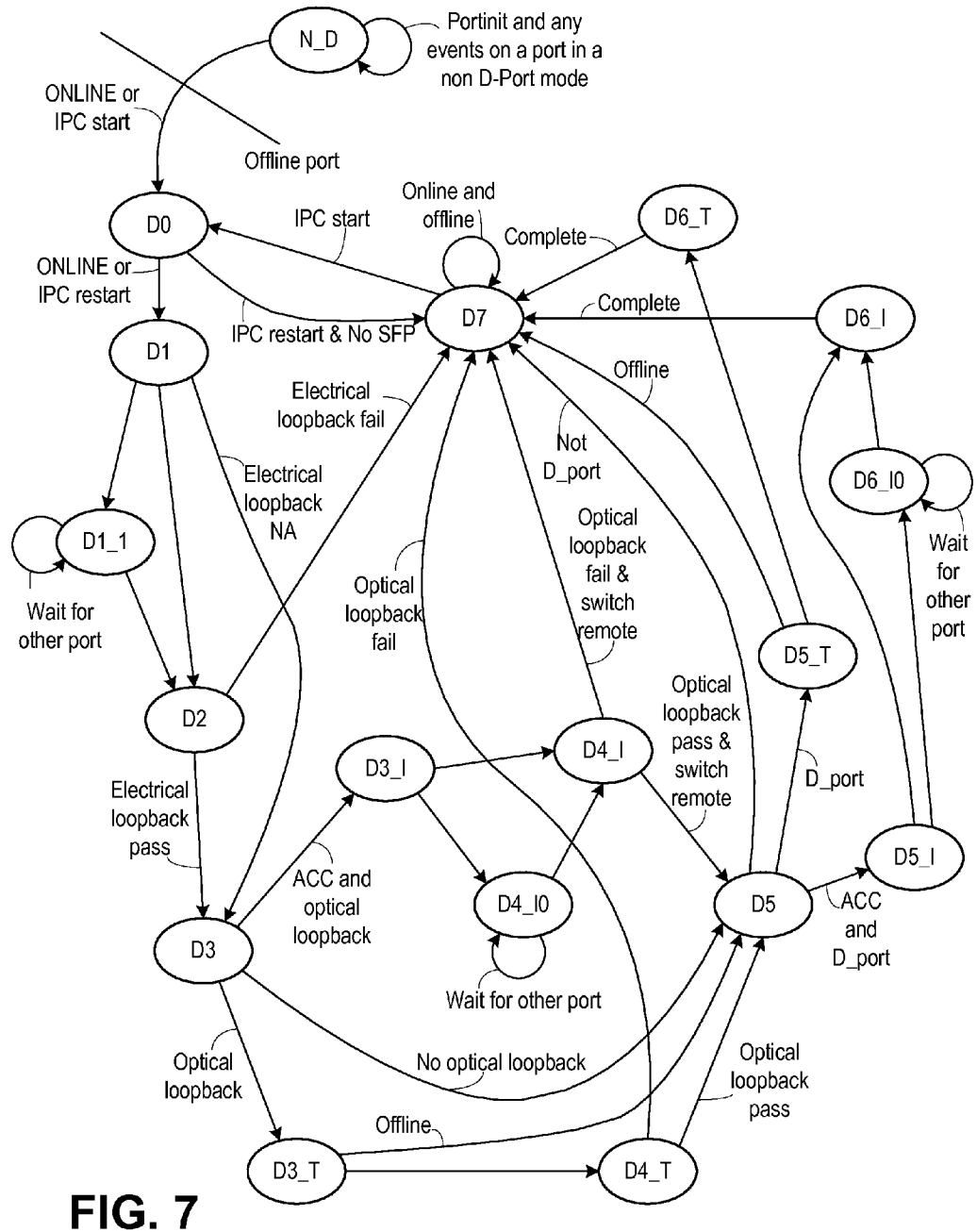
FIG. 7 is a graph diagram illustrating the states of a D_Port as it will go through a D_Port diagnostic according to one embodiment for an inter-switch link.

FIGS. 6A, 6B and 7 illustrate ladder and state diagrams, respectively, showing the state of the D_Ports during the high-level actions performed to achieve D_Port diagnosis, according to one embodiment. As illustrated in FIG. 7, the D_Port state machine will start with the state NOT_D_PORT (N_D). A port will be initialized to an N_D state after the port structure is created. When the port receives a request to start the test with the D_Port mode enabled by either an ONLINE command from the fabric module based on an instruction from a management utility to have the port go online or an inter-process call (IPC) from a management utility, such as diag using the spinfab command directing starting of the test, it will transition from N_D to D_PORT_INIT (D0). As shown in FIGS. 6A, 6B and 7, the port will remain at the D0 state until it receives an ONLINE command or an IPC call to restart the test. At this point, if an SFP module exists, the port will transition to the D_CU_LOOPBACK (D1) state to perform an electrical loopback test. However, if the port is at the D0 state and receives an ONLINE command or IPC call to restart the test while no SFP module exists, the port will transition to the D_PORT_FINAL (D7) state and no testing will be performed.

At the D_CU_LOOPBACK (D1) state, the port may transition to three different states. If the SFP is not capable of an electrical loopback, the port will be toggled and it will go directly to the D_OPTIC_LOOPBACK (D3) state. However, if the SFP supports the electrical loopback test, it will be enabled and the port will go through all the states of E-port initialization from ONLINE to AC_PORT or active. At this stage, if an AC_PORT SCN command is received from the fabric module and another port is running the link test, the port will transition to the D_CU_LOOP_WAIT (D1_1) state and wait for the other port. While at the D1_1 state, the port either waits for the other port to complete the link test or the switch goes through fabric reconfiguration. In either case, the port will transition from D1_1 to the D_CU_LOOP_TEST (D2) state. The port may also directly transition from D1 to D2, if an AC_PORT SCN is received and no other port is running the link test.

While at the D2 state, the procedure will start the electrical loopback test and will enable a child process completion signal. The procedure will also start a timer for worst case scenario, in case the test does not complete. If the electrical loopback test fails or is aborted due to timeout, the port will transition from D2 to the D7 state and the diagnostic test will be stopped by setting the completion code to failure code. However, if the electrical loopback test is completed successfully, the port will transition from D2 to the D_OPTIC_LOOPBACK (D3) state. At this point, the electrical loopback will be cleared and the port will be toggled by the fabric module to indicate to the other port that the test has completed successfully.

At the D3 state, if the external cable is connected and the remote port SFP is capable of optical loopback, the port will perform an optical loopback test by going through all the states of E-port initialization from ONLINE to AC_PORT. At this point, the initiating port sends an exchange link parameters (ELP) command and moves to state D3_I. The responding port returns an ELP ACC and moves to state D3_T. Next the initiating or sending port sends a D_CMD_REQ(TEST_READY, OL) to indicate the desire to do an optical loopback test. The responding or remote port sets the SFP for optical loopback mode. When the SFP is ready, port responds with a D_CMD_RES(TEST_READY_OL) to indicate that the SFP is ready for the optical loopback testing. The ports move to states D4_I and D4_T respectively to perform the optical loopback testing. However, if either SFP does not support optical loopback while in D_Port mode or both ports are not exchanging ELP and ELP ACC, the procedure will not be able to perform an optical loopback and the port will transition to the D_REM_LOOPBACK (D5) state.

At the D3_I state, the port may transition to two different states. If AC_PORT SCN is received and no other port is running the link test, the port will transition to the D_OPTIC_LOOP_BACK_TEST_INIT (D4_I) state. However, if AC_PORT SCN is received and another port is running optical loopback link test, the port will transition to the D_OPTIC_LOOP_BACK_INIT_WAIT (D4_I0) state and wait in that state. At the D4_I0 state, the port is either waiting for another port to complete the link test or the switch is going through fabric reconfiguration. The port will remain in the D4_I0 state until either DOMAIN_VALID SCN is received or the other port completes the link test. Either one of those conditions will cause the port to transition from the D4_I0 state to the D4_I state. While at the D4_I state, the port will determine whether or not the optical loopback test was completed successfully. To do this, the port will start the optical loopback link test, enable child process completion signal, and start a timer for worst case scenario, in case the test does not complete successfully. If the port determines that the optical loopback test has failed or was aborted due to timeout, it will set a failure code and will transition back to D7. However, if it determines that the optical loopback test has completed successfully, it will toggle the port and transition to the D_REM_LOOPBACK (D5) state. It is noted that the toggling is illustrated in both FIGS. 6A and 6B to allow reference between the two figures.

Going back to the D3_T state, while at that state, the port is the target of the optical loopback test and will either proceed to the D_OPTIC_LOOP_BACK_TEST_TARGET (D4_T) state when an AC_PORT SCN is received or transition to the D5 state if it receives an offline SCN. At the D4_T state, the port will wait for an indication that the optical loopback test has completed, enable child process completion signal, and start a timer for worst case scenario, in case the test does not complete. If the port determines that the optical loopback test has failed or was aborted due to timeout, it will set a failure code and will transition back to D7. However, if it finds that the optical loopback test has completed successfully, as indicated by the toggling, it will transition to the D5 state.

When the port goes to the D5 state the port will then go through all the states of E_port initialization from ONLINE to AC_PORT, if the external cable is connected. Next the initiator port will send an ELP, which the remote port will reply to with an ELP ACC. From the D5 state, the port may transition to three different states. If the port is the initiator and the ELP ACC was not received, the port will return to state D7. If the ELP ACC was successfully received, the port will transition to state D5_I, where it can commence a remote optical loopback. If the port is the remote port, it will transition to state D5_T. When the initiator port receives the ELP ACC, it begins the process for remote optical loopback and sends a D_CMD_REQ(TEST_READY, ROL) to indicate it is ready to start the handshake for the remote optical loopback. At this time the remote port transitions to state D5_T and replies with a D_CMD_RES(TEST_READY, ROL) to indicate it will begin the remote optical loopback test. When the initiator port receives the D_CMD_RES (TEST_READY, ROL) it sets its own SFP for optical loopback. The remote port then executes the optical loopback test. When completed, the remote port toggles to indicate completion.

From the D5_I state, the initiator port will either transition to the D_REM_LOOP_BACK_TEST_INIT (D6_I) state or to the D_REM_LOOP_BACK_INIT_WAIT (D6_I0) state. If an AC_PORT SCN is received and no other port is running the link test, then the port will move to the D6_I state. However, if an AC_PORT SCN is received and another port is running the link test, the port will then transition to D6_I0. The port will remain at the D6_I0 state until either a DOMAIN_VALID SCN command is received or the other port completes the link test. In either case, the port will transition from D6_I0 to the D6_I state. At the D6_I state, the initiator port sends a D_CMD_REQ(TEST_READY, LF) command to indicate a desire to start the link frame test. The remote port transitions to state D6_T and sets itself for the looping needed to perform the link frame test. When set, the remote port sends a D_CMD_RES(TEST_READY, LF). The initiator port link frame test procedure starts the link test, enables a child process completion signal, and starts a timer for worst case scenario, in case the test does not complete. When the link frame test completes and the large number of frames have been sent, the initiator port toggles to indicate completion to the remote port. The initiator port will transition from D6_I to D7 whether test is complete or not. If the test fails, the port will transition with the failure code enabled. Otherwise it will transition with the failure code disabled. On the toggle the remote port will move to state D7 for completion.

The D7 state is the final state after the tests are completed. There will be a completion code associated with this state. The completion code will be SUCCESS if all the applicable tests completed successfully; otherwise it will contain the failure code, which will be passed to the CLI and will also be displayed as such.

A D_Port will go through all the steps associated with E-port initialization up to link reset in LOOPBACK states. The usual E-port initialization protocol steps performed after link reset will be skipped for a D_Port. During the electrical and optical loopback and link frame testing, very high numbers of frames are circulated. The port counts the numbers of frames circulated in each to measure the link traffic.

The D_Port diagnostic tests can be performed on long distance ports across two different fabrics, and the D_Port tests can be performed without merging the fabrics. This can be done a single-mode fiber connecting the long-wave SFPs or through DWDM links.

As noted above, any FC port can be configured as a D_Port. Following here are embodiments where an HBA port is configured as a D_Port and cooperates with a switch port configured as a D_Port. Three different embodiments are described, one where the HBA port is not configured as a D_Port but provides many of the functions of a D_Port, a second where the switch D_Port is statically configured and the HBA port is dynamically configured as a D_Port and a third where both the switch port and the HBA port are dynamically configured as D_Ports.

Figure 8:
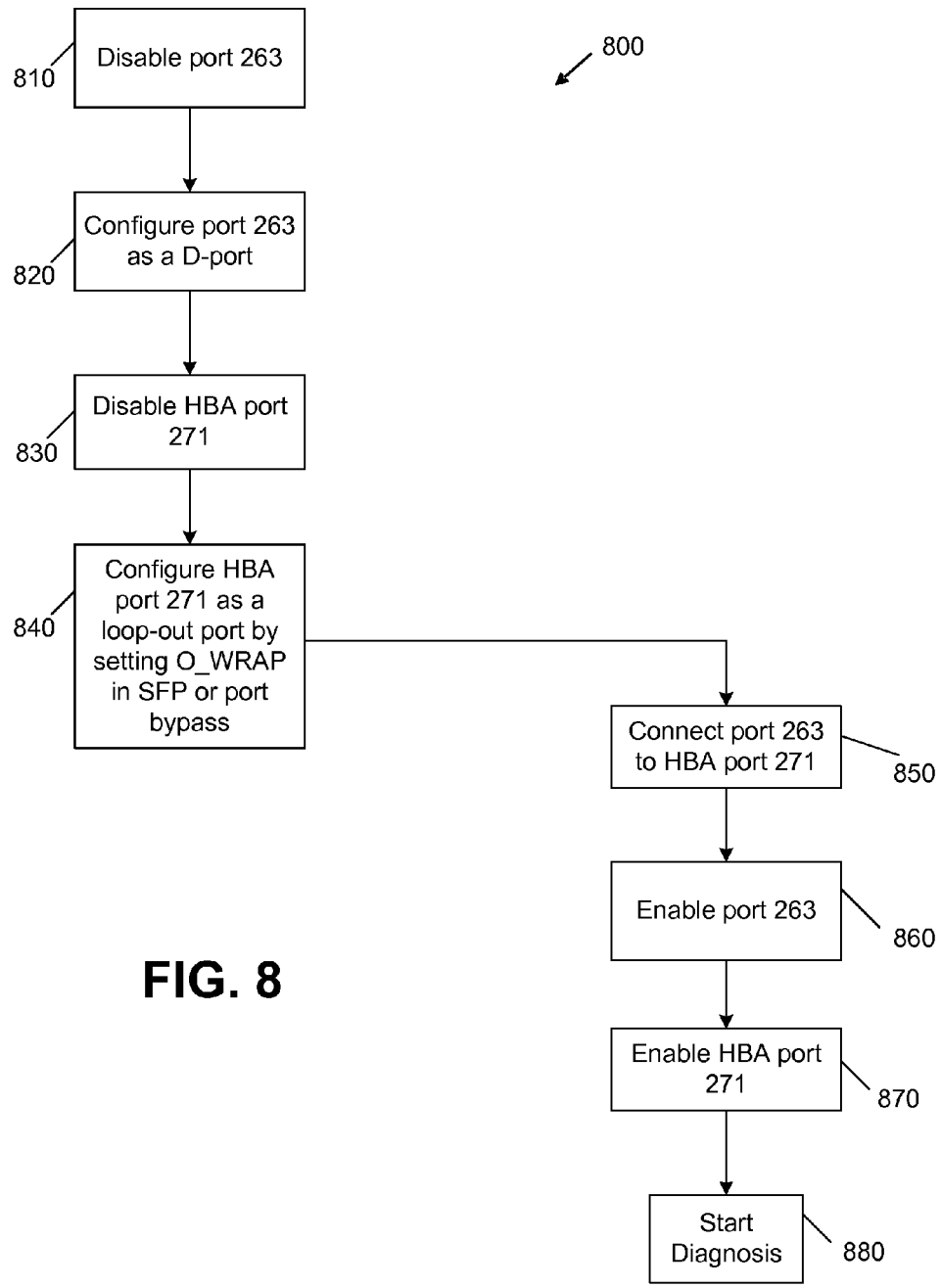
FIG. 8 is a flowchart illustrating a method for configuring a network port as a D_Port and an HBA port to cooperate according to one embodiment.
Figure 9:
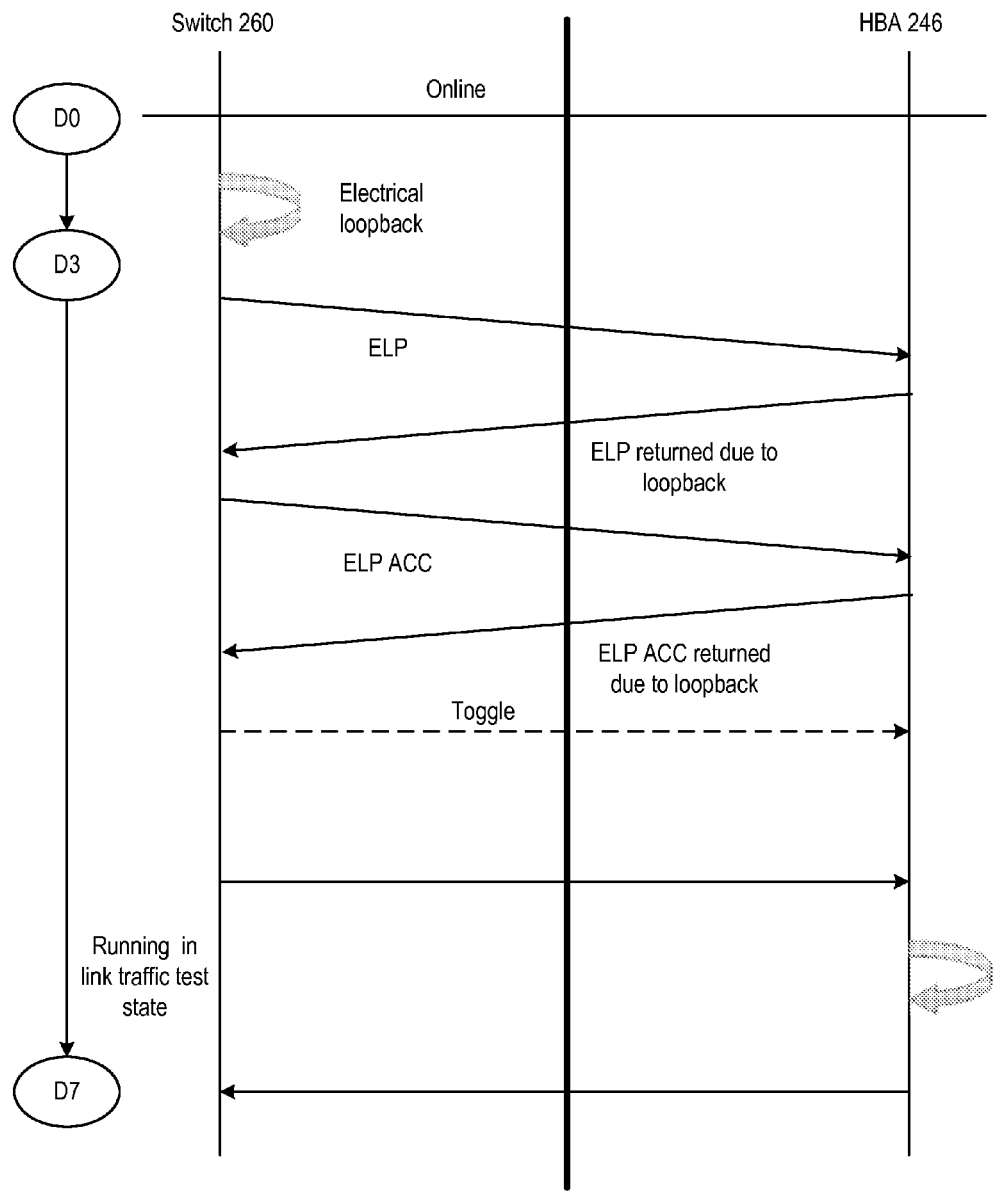
FIG. 9 is a ladder diagram illustrating the states of a D_Port as it will go through a D_Port diagnostic according to one embodiment for a node link.

FIGS. 8 and 9 describe the first HBA embodiment. In step 810 the switch port 263 is disabled. In step 820 the switch port 263 is configured as a D_Port. In step 830 the HBA port 271 is disabled. In step 840 the HBA port is configured as a loop-out port by setting O_WRAP in the SFP or otherwise setting the port in port bypass mode. In step 850 ports 263 and 271 are connected. In step 860 port 263 is enabled. In step 870 HBA port 271 is enabled, so that in step 880 diagnostic operation can begin. Those operations are shown in ladder format in FIG. 9. The ladder starts with both ports being online. The switch port 263 starts in state D0, where electrical loopback operations are performed. When the operations are completed, state advances to D3 and an ELP command is provided. As the HBA port 271 is in loopback mode, the ELP command is simply returned back to the switch port 263. This results in the switch port 263 providing an ELP ACC, which again is looped back. When this second communication is detected as being looped back, the switch port 263 is set to link frame mode and toggled to reset the port. The switch 264 clears its error counters for that port and then initiates the link frame test, where a very large number of frames are transmitted and then looped back by the HBA port 271. When sufficient frames have been sent, the error counters are checked and results are provided. While the link is tested and at least some results are provided, many other parts of the HBA 246 are not tested.

Figure 10:
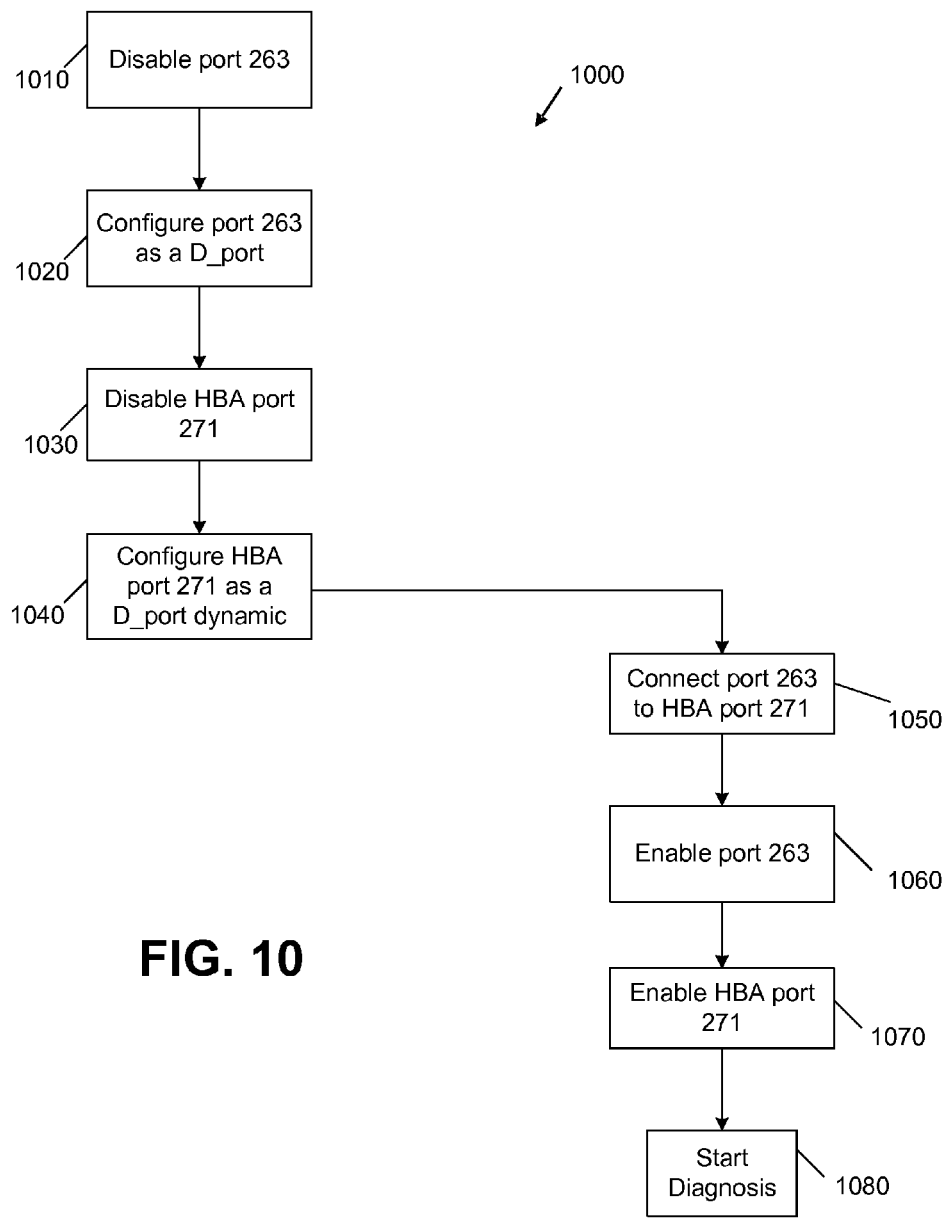
FIG. 10 is a flowchart illustrating a method for configuring a network port and an HBA port as D_Ports according to one embodiment.

FIGS. 10, 11A, 11B and 11C illustrate an embodiment that more fully tests the HBA port 271. The steps of FIG. 10 are similar to the steps of FIG. 8 except that in step 1040 the HBA port 271 is configured as a D_Port dynamic, namely on request by the management application 248 or when the connected switch port is in static D_Port mode.

Figure 11A:
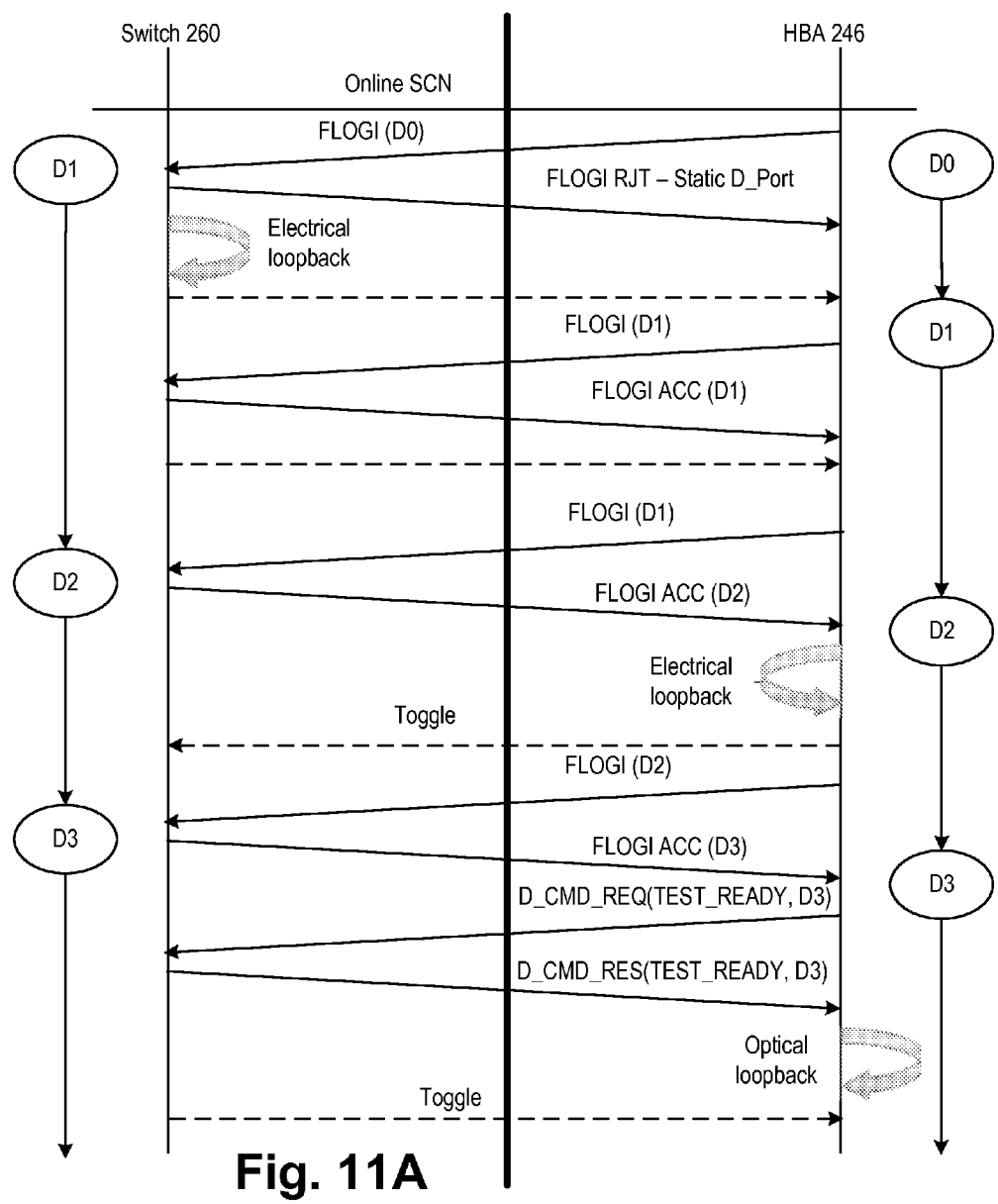
FIGS. 11A, 11B and 11C are a ladder diagram illustrating the states of the D_Ports as they will go through a D_Port diagnostic according to one embodiment for a node link.

The ladder diagram of FIG. 11A starts with both ports going online. The switch port 263 is in state D1. The HBA port 271 is in state D0 and transmits a normal FLOGI to log into the fabric. As shown, this is indicated by D0 in the FLOGI frame. In the preferred embodiment the FLOGI and FLOGI ACC frames are used to communicate state between the switch port 263 and the HBA port 271. In the preferred embodiment bits in the Vendor Version Level field in the FLOGI frame are used, though another option is to use flag bits in the FLOGI frame as well. When the switch port 263 receives the FLOGI D0, it responds with an FLOGI RJT, with a stated reason of Static D_Port, to indicate it is configured as a static D_Port. The HBA port 271 interprets this response as an indication to enter D_Port mode, which it does by advancing to state D1. The switch port 263 then performs electrical loopback testing. Any FLOGI frames during this testing will be ignored and eventually repeated by the HBA port 271. When the switch port 263 completes the testing, it toggles its state, which indicates to the HBA port 271 that the switch port 263 is ready to proceed, so the HBA port 271 sends an FLOGI D1 frame, indicating it is in state D1. The switch port 263 responds by returning an FLOGI ACC D1. The switch port 263 then again toggles and advances to state D2. After that toggle the HBA port 271 sends another FLOGI D1. The switch port 263 responds this time by returning an FLOGI ACC D2, indicating it is in state D2 and the HBA port 271 should advance to state D2.

In state D2 the HBA port 271 performs electrical loopback testing and then toggles on and off to indicate its completion. The switch port 263 advances to state D3. The HBA port 271 then sends an FLOGI D2 to the switch port 263 to indicate it is ready to advance. The switch port 263 returns an FLOGI ACC D3. The HBA port 271 advances to state D3 and sends a D_CMD_REQ(TEST_READY, D3) to indicate that it wishes to move forward. The switch port 263 returns a D_CMD_RES(TEST_READY, D3) to indicate that the testing will begin. The HBA port 271 configures itself for optical loopback for the next test phase. The switch port 263 next sends a very large number of frames, which are looped back, to test the link and the optics in the HBA SFP. When the optical loopback is completed, the switch port 263 toggles, indicating completion to the HBA port 271. The HBA Port 271 responds with an FLOGI D3, indicating completion of state D3. The switch port 263 advances to state D4 and returns an FLOGI ACC D4. The HBA port 271 advances to state D4 and sends a D_CMD_REQ(TEST_READY, D4) to indicate that it is ready to begin its optical loopback testing. The switch port 263 configures itself for optical loopback and returns a D_CMD_RES(TEST_READY, D4) to indicate that the testing can begin. The HBA port 271 next sends a very large number of frames, which are looped back, to test the link and the optics in the switch port SFP. When the optical loopback is completed, the HBA port 271 toggles, indicating completion to the switch port 263. As above, this toggle is shown in both FIGS. 11A and 11B for reference between the figures.

The HBA port 271 then transmits an FLOGI D4, indicating completion of state D4. The switch port 263 advances to state D5 and returns an FLOGI ACC D5. The HBA port 271 advances to state D5 and prepares itself for link traffic or port level wrap mode, so that the entire path to the relevant ASIC or chip can be tested. The HBA port 271 provides a D_CMD_REQ(TEST_READY, D5) to indicate that it is ready to move to the next phase. The switch port 263 returns a D_CMD_RES(TEST_READY, D5) to indicate that the testing will begin. The HBA port 271 configures itself for port loopback for the next test phase. The switch port 263 next sends a very large number of frames, which are looped back, to test the link, the optics in the HBA SFP and various components up to and into the FC chip 500. When the port loopback or link frame test is completed, the switch port 263 toggles, indicating completion to the HBA port 271. The HBA Port 271 responds with an FLOGI D5, indicating completion of state D5. The switch port 263 advances to state D6 and returns an FLOGI ACC D6. The HBA port 271 advances to state D6 and sends a D_CMD_REQ(TEST_READY, D6) to indicate that it is ready to begin its link traffic or port loopback testing. The switch port 263 configures itself for port loopback and returns a D_CMD_RES(TEST_READY, D6) to indicate that the testing can begin. The HBA port 271 next sends a very large number of frames, which are looped back, to test the link, the optics in the switch port SFP and into the ASIC. When the port loopback is completed, the HBA port 271 toggles, indicating completion to the switch port 263.

The HBA port 271 then sends an FLOGI D6. The switch port 263 advances to state D7, the last state, and responds with an FLOGI ACC D7. The HBA port 271 advances to state D7 and provides a D_CMD_REQ(Results), which contains the results of the testing done on its end. The switch port 263 replies with a D_CMD_RES(Results), to provide its results to the HBA 246.

Thus, when the HBA port 271 is configured in D_Port dynamic mode, full testing of the connection, as done with the ISL D_Port configuration, can be performed.

Figure 11B:
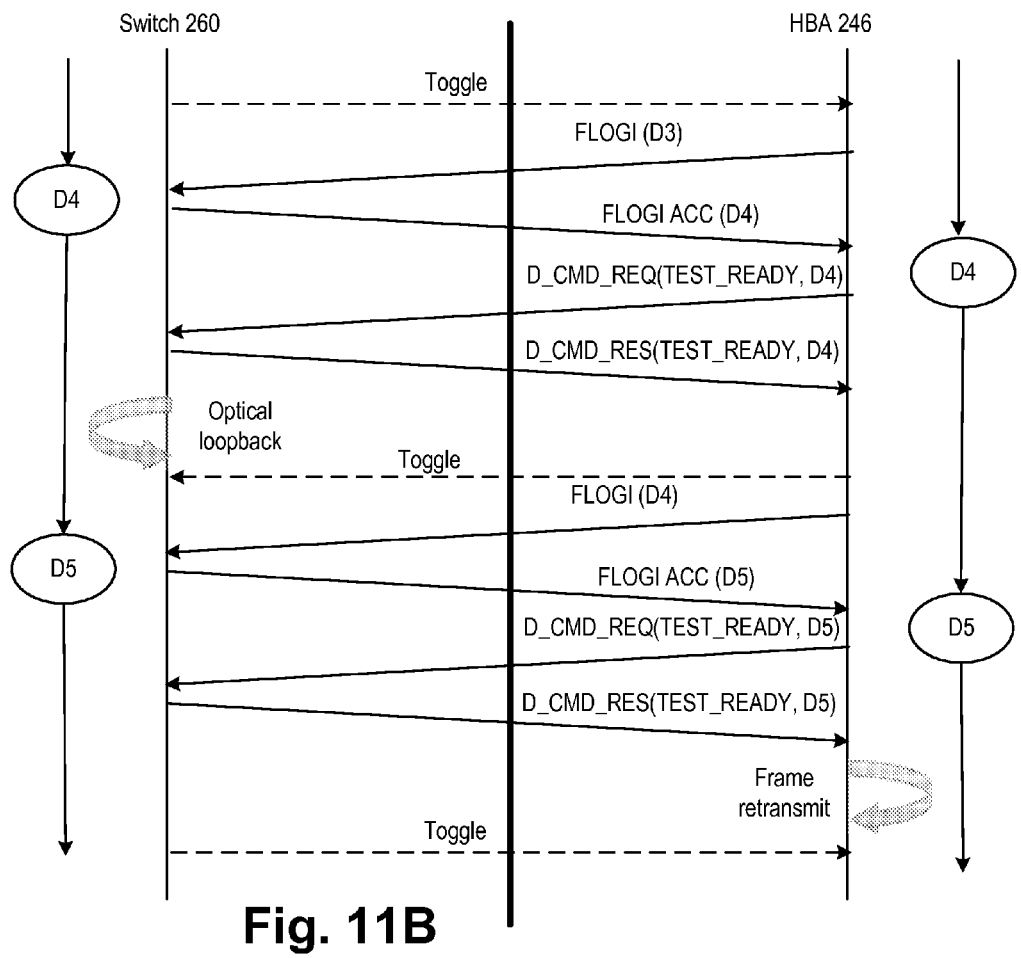
Figure 11C:
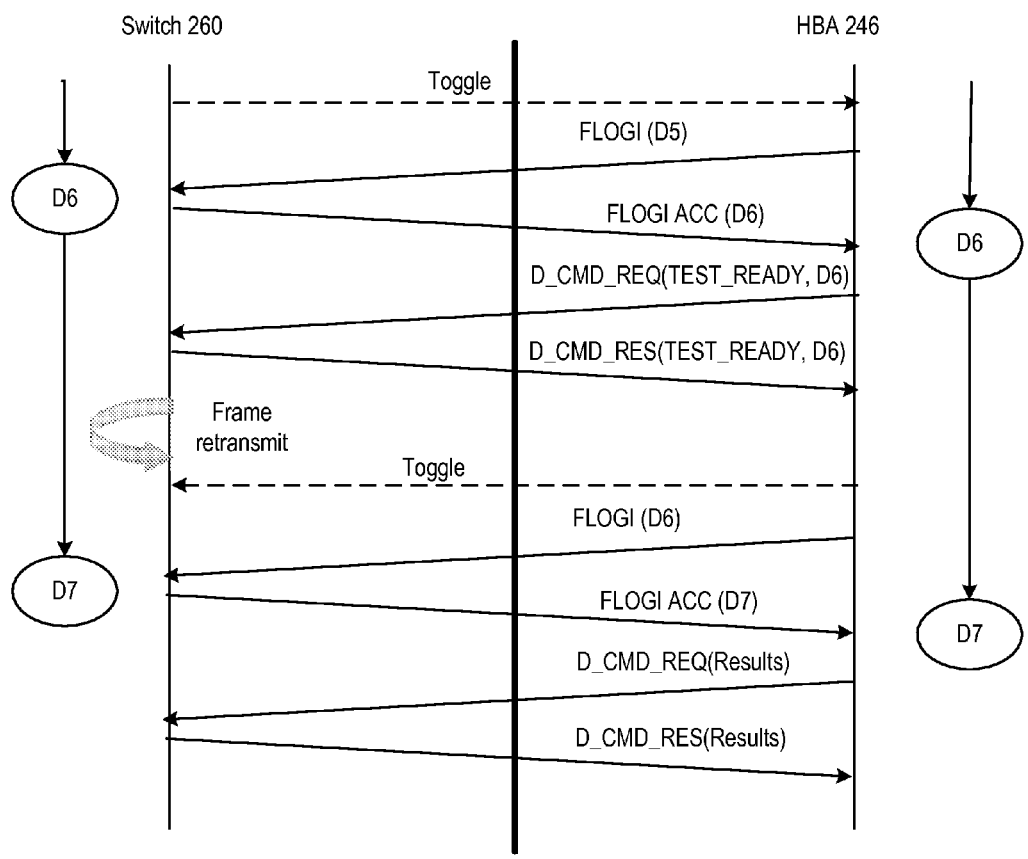
Figure 12:
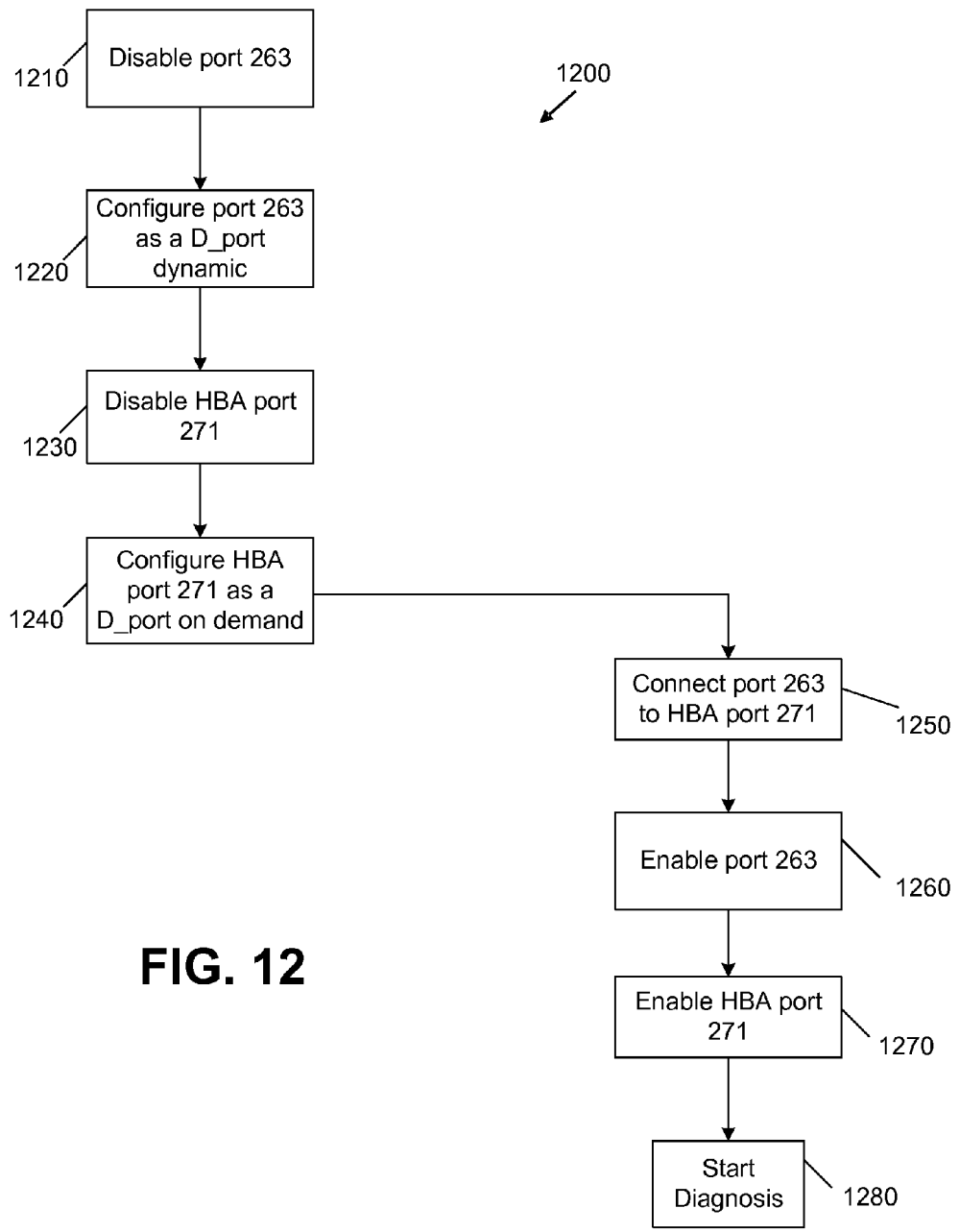
FIG. 12 is a flowchart illustrating a method for configuring a network port and an HBA port as D_Ports according to one embodiment for a node link.
Figure 13A:
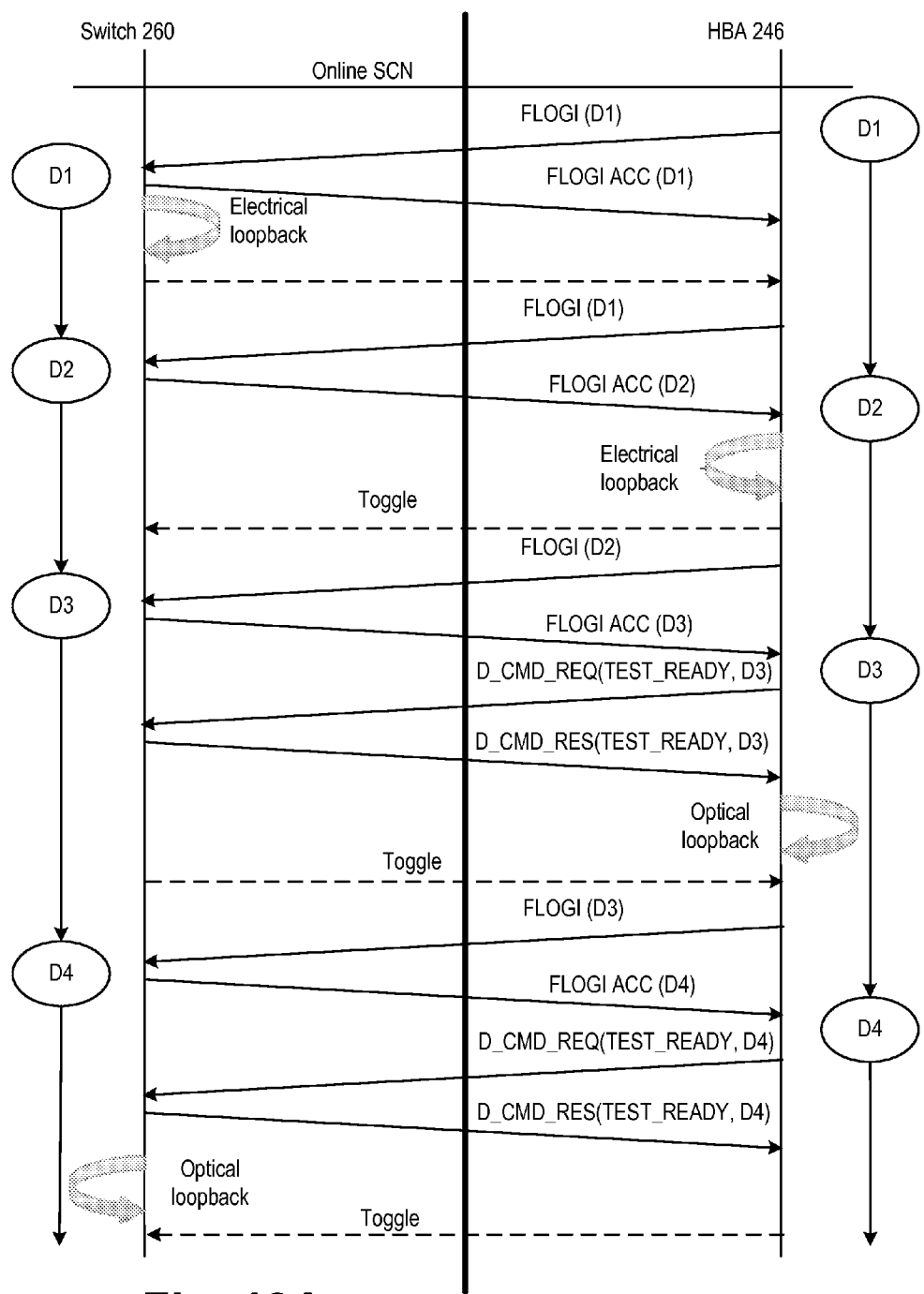
FIGS. 13A and 13B are a ladder diagram illustrating the states of the D_Ports as they will go through a D_Port diagnostic according to one embodiment for a node link.
Figure 13B:
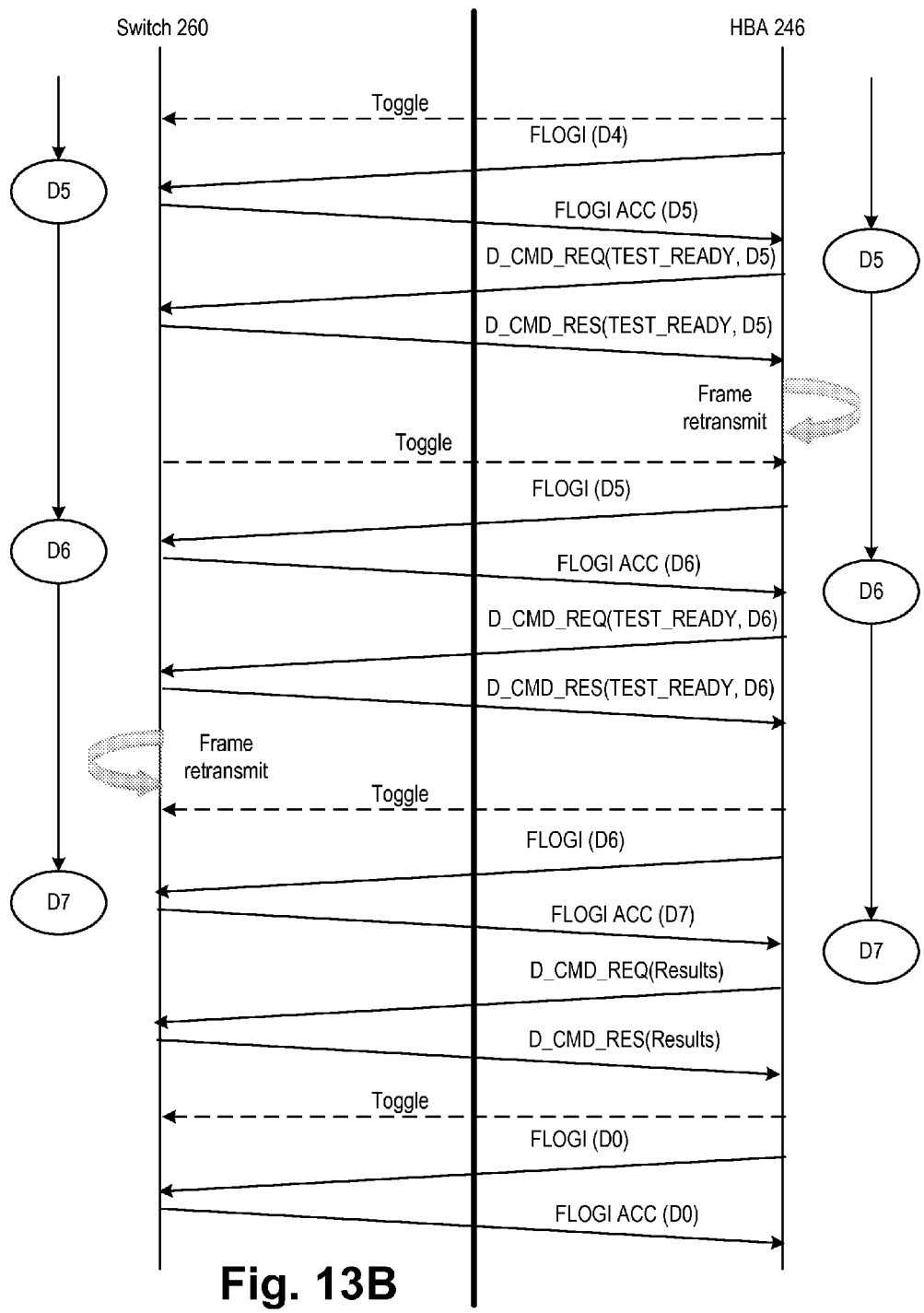

FIGS. 12, 13A and 13B indicate an embodiment where the switch port 263 is configured as a dynamic D_Port and the HBA port 271 is configured as an on demand port. In on demand mode the port behaves like a normal port but switches over to D_Port mode when an internal event, such as power on or an error, occurs. In this mode the switch port 263 operates normally until it receives an FLOGI D1, at which time it changes over to D_Port mode. The steps of FIG. 12 are similar to the steps of FIG. 10 except that in step 1220 the switch port 263 is configured as a dynamic D_Port and the HBA port is configured as an on demand port. FIGS. 13A and 13B are generally the same as FIGS. 11A and 11B, except that the HBA port 271 starts in state D1 by transmitting an FLOGI D1. The HBA port 271 enters this state because of a power-on test or an internal error.

Operation proceeds as in FIGS. 11A and 11B until states D7 are reached. After the switch port 263 sends its D_CMD_RES(Results), the HBA port 271 acknowledges by toggling. This toggling is an indication to both ports 263 and 271 to revert back to normal port operation, namely an F_Port and an N_Port. The HBA port 271 begins by sending an FLOGI D0 for a normal fabric login. The switch port 263 responds with an FLOGI ACC D0, a normal FLOGI ACC, and then operation continues as normal.

Other combinations are also possible. For example, both ports 263 and 271 can be configured as static D_Ports so normal D_Port operations begin upon connection, namely the switch port 263 commencing electrical loopback testing as discussed above. Alternatively, the HBA port 271 can be configured as a static D_Port and the switch port 263 can be a dynamic D_Port. The HBA port 271 will commence with an FLOGI D1, which the switch port 263 will respond with an FLOGI ACC D1 so that it can perform its electrical loopback testing. Then operation will proceed as above.

The roles of FIGS. 12, 13A and 13B can be reversed, so that operations begin when the switch 264 powers on rather than the HBA 246. The switch port 263 will begin doing the electrical loopback tests and either ignore or reject any FLOGI D0 frames received. Operation will proceed as in FIGS. 11A and 11B.

If both ports 263 and 271 are configured in dynamic mode, a user can initiate tests from the HBA as would have been possible for the embodiment of described in FIGS. 10, 11A, 11B and 11C, though in that specific example the HBA port 271 entered D_Port mode because the switch port 263 was in static D_Port mode. Both ports will start up normally. When a user command is received at the HBA 246, it will transition the HBA port 271 to D_Port mode and start the process, with an FLOGI D1 from the HBA port 271. The receipt of the FLOGI D1 will trigger the switch port 263 into D_Port mode and the full test will occur.

If both devices are configured in on demand mode, if either the switch 264 or the HBA 246 detect internal errors that indicate the need for a link test, then the switch 264 or the HBA 246 can itself commence D_Port operation. For example, if the HBA 246 determined the need, operation will proceed as in FIGS. 13A and 13B.

In other embodiments, dynamic and on demand modes can be combined, resulting in normal operation until either power on, an error or a user request.

It is understood that many of the above states can be skipped if the required capability is not present or there are errors that have occurred. The need to skip can be indicated in one embodiment by simply advancing the state value in the next FLOGI or FLOGI ACC frame to the next operation that can be performed or can be done in another embodiment by using a D_CMD_REQ(TEST_SKIP) command when a given test is requested or is to begin.

It is also understood that the disabling and enabling of the switch port and the HBA port as done in FIGS. 10 and 12 may not strictly be necessary for each diagnostic session when the ports are in the on demand or dynamic modes. Those modes can be stored so that upon power up of the switch or HBA the ports directly enter those modes without further specific user commands. A diagnostic session can be started at a later time on user command as discussed above, after the ports have been connected, active and communicating for some time, without specifically disabling and re-enabling the ports. FIGS. 10 and 12 are provided for contrast to FIGS. 4 and 8, where disabling is required as the ports must be taken offline to enter the static D_Port mode.

Therefore full testing of the switch and HBA link, a node link, can be done in the same manner as the ISL, though with slightly different commands due to the nature of the ports.

It is further noted that because switch ports can be configured as demand or as dynamic ports, should one of the switch ports be configured in on demand mode and one in dynamic mode, similar automatic on command or on reset diagnostic testing can occur when initiated from the on demand port. If both switch ports are set to dynamic mode, then on request testing can be done on ISLs as well from either end, with operation returning to normal ISL operations if there are no errors.

Accordingly, the D_Port diagnostic tests can be utilized to perform link level sanity tests in Fibre Channel networks. Such testing includes performing an electrical loopback test, an optical loopback test, and a link traffic test. To achieve this diagnostic testing, two ports at each end of a link are first identified and then statically configured by a user. The ports will be configured as D_Ports and as such will be completely isolated from the fabric with no data traffic flowing through them. The ports are then used to send test frames to perform the diagnostic tests. In this manner, the D_Port diagnostic tests improve testing capabilities for detecting single link faults.

Although described above generally in terms of FC fabrics and using FC terminology, the problems and techniques for graceful decommissioning of ports are not limited to FC fabrics and protocols, but may be implemented using similar techniques to those described above in Ethernet and other types of networks, including lossless networks using IEEE Data Center Bridging.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A device comprising:
   a processor;
   a network frame handling element coupled to said processor and including a capability to loop back received frames from a connected remote device; and
   a network port coupled to said processor and to said network frame handling element, said network port including a media interface module with capabilities to loop back optical signals from said connected remote device, wherein said processor is adapted to configure said network frame handling element and said network port to leave a normal operating mode and enter a diagnostic mode on request, wherein said diagnostic mode includes at least one of looping back received optical signals and received frames from said connected remote device and occurs for a diagnostic mode period, and where there is no normal traffic exchanged during said diagnostic mode, wherein said network port is configured as a dynamic port so that said processor is able to automatically revert back said dynamic port from said diagnostic mode to said normal operating mode after said diagnostic mode period has ended, and wherein said processor is adapted to automatically return said network frame handling element and said network port to said normal operating mode based on said diagnostic mode period ending, said network port being configured as said dynamic port, and a determination that a diagnostic mode period for a network port of said connected remote device has ended, and wherein said network port receives at least one message from said connected remote device after said diagnostic mode period ends that indicates said network port and said network port of said connected remote device should revert back to said diagnostic mode.

2. The device of claim 1, wherein said request is initiated on resetting of the device.

3. The device of claim 1, wherein loopback of the received optical signals ends when said network frame handling element and said network port automatically returns back to said normal operating mode from said diagnostic mode.

4. The device of claim 1, wherein the device is a switch and said network frame handling element is a switch ASIC.

5. The device of claim 1, wherein the device is a host bus adaptor (HBA) and said network frame handling element is an HBA chip.

6. The device of claim 1, wherein said network port and said media interface module conform to Fibre Channel standards.

7. A network comprising:
a first device including a first processor, a first network frame handling element coupled to said first processor and including a capability to loop back received frames and a first network port coupled to said first processor and to said first network frame handling element, said first network port including a first media interface module with capabilities to loop back remote optical signals;
a second device including a second processor, a second network frame handling element coupled to said second processor and including a capability to loop back received frames and a second network port coupled to said second processor and to said second network frame handling element, said first network port including a second media interface module with capabilities to loop back remote optical signals; and
a link connected to said first media interface module and to said second media interface module;
wherein each of said first and second processors is adapted to configure said respective network frame handling element and said respective network port to leave a normal operating mode and enter a diagnostic mode on request,
wherein said diagnostic mode includes at least one of looping back received optical signals and received frames between said first device and said second device and occurs for a diagnostic mode period and where there is no normal traffic during said diagnostic mode,
wherein at least one of said first network port and said second network port is configured as a dynamic port that allows for automatic revision from said diagnostic mode to said normal operating mode after said diagnostic mode period has ended, and
wherein said first processor is adapted to automatically return said first network frame handling element and said first network port to said normal operating mode based on said diagnostic', mode period ending, said first network port being configured as said dynamic port, and a determination that a diagnostic mode period for said second network port of said second device has ended, and
wherein said first network ort receives at least one message from said second device after said diagnostic mode period ends that indicates said first network port and said second network port should revert back to said diagnostic mode.

8. The network of claim 7, wherein said request to said first processor is initiated on resetting of the first device and said request to said second processor is received at said second network port from the first device.

9. The network of claim 7, wherein loopback of the received optical signals ends when said first network frame handling element and said first network port automatically returns back to said normal operating mode from said diagnostic mode.

10. The network of claim 7, wherein the first device is a host bus adaptor and the second device is a switch.

11. The network of claim 7, wherein said first and second network ports and said first and second media interface modules conform to Fibre Channel standards.

12. A method comprising:
configuring a first network frame handling element and a first network port in a first device to leave a normal operating mode and enter a diagnostic mode on request, where said diagnostic mode includes at least one of looping back received optical signals and received frames and occurs for a diagnostic mode period;
configuring a second network frame handling element and a second network port in a second device to leave a normal operating mode and enter a diagnostic mode on request, wherein said diagnostic mode includes at least one of looping back received optical signals and received frames between said first device and said second device and occurs for said diagnostic mode period and where there is no normal traffic during said diagnostic mode;
performing diagnostic mode operations between said first network frame handling element and said first network port in said first device and said second network frame handling element and said second network port in said second device, wherein at least one of said first network port and said second network port is configured as a dynamic port that allows for automatic reversion from said diagnostic mode to said normal operating mode after said diagnostic mode period has ended; and
automatically returning said first network frame handling element and said first network port to said normal operating mode based on said diagnostic mode period ending, said first network port being configured as said dynamic port, and a determination that a diagnostic mode period for said second network port of said second device has ended, and wherein said first network port receives at least one message from said second device after said diagnostic mode period ends that indicates said first network port and said second network port should revert back to said diagnostic mode.

13. The method of claim 12, wherein said request to configure the first network frame handling element and the first network port in the first device is initiated on resetting of the first device and said request to configure the second network frame handling element and the second network port in the second device is received from the first device.

14. The method of claim 12, wherein loopback of the received optical signals ends when said first network frame handling element and said first network port automatically returns back to said normal operating mode from said diagnostic mode.

15. The method of claim 12, wherein the first device is a host bus adaptor and the second device is a switch.

16. A method comprising:
configuring a network frame handling element and a network port in a network device to leave a normal operating mode and enter a diagnostic mode on request, wherein said diagnostic mode includes at least one of looping back received optical signals and received frames from a connected remote device and occurs for a period, and where there is no normal traffic during said diagnostic mode;
performing diagnostic mode operations using said network frame handling element and said network port, wherein said network port is configured as a dynamic port that allows for automatically reversion from said diagnostic mode to said normal operating mode after a diagnostic mode period has ended; and
automatically returning the network frame handling element and the network port to said normal operating mode based on said diagnostic mode period ending, said network port being configured as said dynamic port, and a determination that a diagnostic mode period for a network port of said connected remote device has ended, and
wherein said network port receives at least one message from said connected remote device after said diagnostic mode period ends that indicates said network port and said network port of said connected remote device should revert back to said diagnostic mode.

17. The method of claim 16, wherein said request is initiated on resetting of the network device.

18. The method of claim 16, wherein loopback of the received optical signals ends when said network frame handling element and said network port automatically returns back to said normal operating mode from said diagnostic mode.

19. The method of claim 16, wherein the network device is a switch and the said network frame handling element is a switch ASIC.

20. The method of claim 16, wherein the network device is a host bus adaptor (HBA) and said network frame handling element is an HBA chip.

* * * * *